US011926095B2

(12) United States Patent
Sugai

(10) Patent No.: US 11,926,095 B2
(45) Date of Patent: Mar. 12, 2024

(54) THREE-DIMENSIONAL OBJECT PRINTING APPARATUS

(71) Applicant: SEIKO EPSON CORPORATION, Tokyo (JP)

(72) Inventor: Keigo Sugai, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/899,651

(22) Filed: Aug. 31, 2022

(65) Prior Publication Data
US 2023/0062985 A1 Mar. 2, 2023

(30) Foreign Application Priority Data

Sep. 1, 2021 (JP) ................................. 2021-142195
Sep. 1, 2021 (JP) ................................. 2021142195

(51) Int. Cl.
*B29C 64/232* (2017.01)
*B29C 64/129* (2017.01)
*B29C 64/209* (2017.01)
*B29C 64/236* (2017.01)
*B29C 64/241* (2017.01)
*B29C 64/264* (2017.01)
*B33Y 10/00* (2015.01)
*B33Y 30/00* (2015.01)

(52) U.S. Cl.
CPC .......... *B29C 64/232* (2017.08); *B29C 64/129* (2017.08); *B29C 64/209* (2017.08); *B29C 64/236* (2017.08); *B29C 64/241* (2017.08); *B29C 64/264* (2017.08); *B33Y 10/00* (2014.12); *B33Y 30/00* (2014.12)

(58) Field of Classification Search
CPC .................................................. B29C 64/236
See application file for complete search history.

(56) References Cited

U.S. PATENT DOCUMENTS 6,523,921 B2 * 2/2003 Codos ................ B41J 11/00212
    347/8
6,755,518 B2 * 6/2004 Codos ........................ B41J 2/01
    347/102

(Continued)

FOREIGN PATENT DOCUMENTS

JP         2008-246855 A     10/2008
WO    WO-2021262926 A1 *    12/2021

*Primary Examiner* — Atul P. Khare
(74) *Attorney, Agent, or Firm* — Harness, Dickey & Pierce, P.L.C.

(57) ABSTRACT

A three-dimensional object printing apparatus includes a first head, an energy emitter, and a moving mechanism. The first head has a first nozzle face in which a nozzle for ejecting liquid is provided. The energy emitter has an emission face from which energy for curing the liquid ejected from the first head is emitted. The moving mechanism changes relative position of the first head and the energy emitter in relation to a three-dimensional workpiece. The moving mechanism includes a linear motion mechanism that changes the relative position of the first head and the energy emitter in relation to the workpiece along a first axis, a first up-and-down mechanism that moves the first nozzle face along a second axis intersecting with the first axis, and a second up-and-down mechanism that moves the emission face along the second axis.

16 Claims, 8 Drawing Sheets

(56) References Cited

U.S. PATENT DOCUMENTS

| | | | | |
|---|---|---|---|---|
| 7,162,325 B2* | 1/2007 | Silverbrook | ............ | H05K 1/185 |
| | | | | 425/375 |
| 7,210,408 B2* | 5/2007 | Uptergrove | .............. | B41J 3/543 |
| | | | | 101/35 |
| 7,625,059 B2* | 12/2009 | Uptergrove | ............ | B41J 3/4073 |
| | | | | 347/101 |
| 9,272,815 B2* | 3/2016 | Uptergrove | ............ | B41J 29/377 |
| 10,583,645 B2* | 3/2020 | Cofler | ................... | B29C 64/176 |
| 10,696,034 B2* | 6/2020 | Pattinson | .............. | B29C 64/232 |
| 11,141,994 B2* | 10/2021 | Bullington | ............ | G06F 3/1237 |
| 11,161,298 B2* | 11/2021 | Gifford | ................. | B29C 64/209 |
| 11,383,540 B2* | 7/2022 | Hyuga | ................... | B41J 25/304 |
| 2006/0093751 A1* | 5/2006 | White | ................... | B41J 25/005 |
| | | | | 427/466 |
| 2008/0117248 A1* | 5/2008 | Uptergrove | ............ | B41J 29/377 |
| | | | | 347/16 |
| 2008/0186354 A1* | 8/2008 | White | ................... | B41J 25/003 |
| | | | | 347/38 |
| 2018/0154573 A1* | 6/2018 | Miles | ................... | H05K 3/1241 |
| 2021/0170769 A1* | 6/2021 | Hyuga | ................ | B41J 2/04586 |
| 2023/0088150 A1* | 3/2023 | Sugai | ................... | B41J 2/04581 |
| | | | | 341/1 |

\* cited by examiner

THREE-DIMENSIONAL OBJECT PRINTING APPARATUS

The present application is based on, and claims priority from JP Application Serial Number 2021-142195, filed Sep. 1, 2021, the disclosure of which is hereby incorporated by reference herein in its entirety.

BACKGROUND

1. Technical Field

An embodiment of the present disclosure relates to a three-dimensional object printing apparatus.

2. Related Art

A three-dimensional object printing apparatus that performs printing on a surface of a three-dimensional workpiece using an ink-jet technique is known. For example, JP-A-2008-246855 discloses an apparatus that includes a head in which nozzles for ejecting ultraviolet curable ink and a light emitting unit that emits ultraviolet light are built in.

However, there is a problem in the related art described above in that the interference of a component of the apparatus, for example, the light emitting unit, with a workpiece could occur when it is attempted to set an appropriate distance between the nozzles and the workpiece having a curved surface or an irregular surface, etc. in order to enhance print quality.

SUMMARY

A three-dimensional object printing apparatus according to a certain aspect of the present disclosure includes a first head having a first nozzle face in which a nozzle for ejecting liquid is provided; an energy emitter having an emission face from which energy for curing the liquid ejected from the first head is emitted; and a moving mechanism that changes relative position of the first head and the energy emitter in relation to a three-dimensional workpiece, wherein the moving mechanism includes a linear motion mechanism that changes the relative position of the first head and the energy emitter in relation to the workpiece along a first axis, a first up-and-down mechanism that moves the first nozzle face along a second axis intersecting with the first axis, and a second up-and-down mechanism that moves the emission face along the second axis.

DESCRIPTION OF EXEMPLARY EMBODIMENTS

Figure 1:
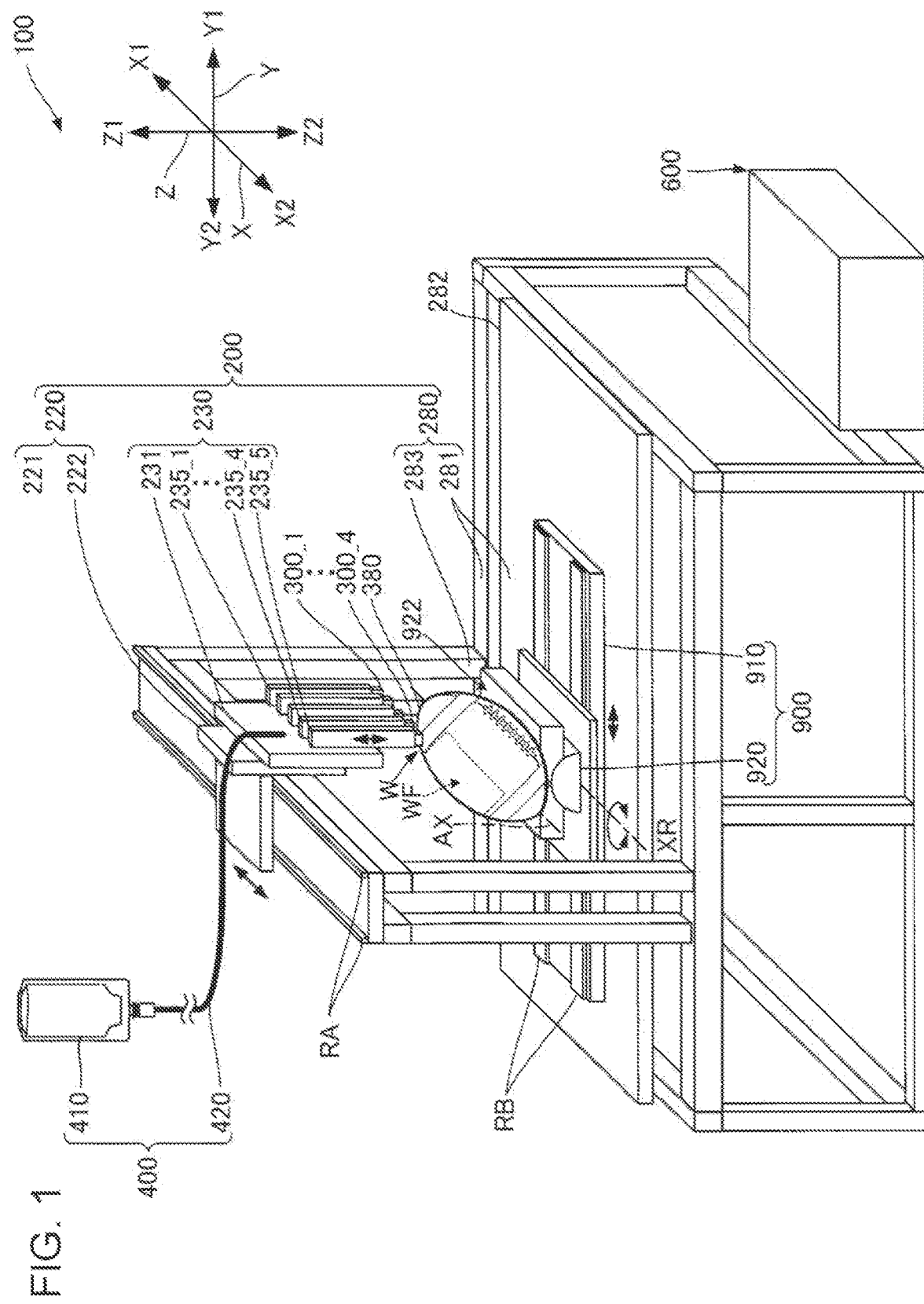
FIG. 1 is a schematic perspective view of a three-dimensional object printing apparatus according to a first embodiment.

With reference to the accompanying drawings, an embodiment of the present disclosure will now be explained. In the drawings, the dimensions and scales of components may be made different from those in actual implementation. Since the embodiment described below shows some preferred examples of the present disclosure, they contain various technically-preferred limitations. However, the scope of the present disclosure shall not be construed to be limited to the examples described below unless and except where the description contains an explicit mention of an intent to limit the present disclosure.

The description below is given with reference to X, Y, and Z axes intersecting with one another. One direction along the X axis will be referred to as the X1 direction. The direction that is the opposite of the X1 direction will be referred to as the X2 direction. Similarly, directions that are the opposite of each other along the Y axis will be referred to as the Y1 direction and the Y2 direction. Directions that are the opposite of each other along the Z axis will be referred to as the Z1 direction and the Z2 direction.

The X, Y, and Z axes are coordinate axes of a base coordinate system set in a space in which a workbench 281 to be described later is installed. Typically, the Z axis is a vertical axis, and the Z2 direction corresponds to a vertically-downward direction. The Z axis does not necessarily have to be a vertical axis. The X, Y, and Z axes are typically orthogonal to one another, but are not limited thereto; they could be mutually non-orthogonal axes. For example, it is sufficient as long as the X, Y, and Z axes intersect with one another within an angular range of 80° or greater and 100° or less.

1. First Embodiment

1-1. Overview of Three-Dimensional Object Printing Apparatus

FIG. 1 is a schematic perspective view of a three-dimensional object printing apparatus 100 according to a first embodiment. The three-dimensional object printing apparatus 100 is an apparatus that performs ink-jet printing on a surface of a three-dimensional workpiece W.

The workpiece W is a print target medium. The workpiece W has a print target face WF, on which printing is to be performed. In the example illustrated in FIG. 1, the workpiece W is a rugby ball having a shape of a prolate spheroid with a major axis AX. The face WF is a curved surface the curvature of which is not constant. In the present embodiment, the workpiece W is placed such that its major axis AX is parallel to the X axis. The workpiece W is not limited to a rugby ball. For example, the workpiece W is an object that is processed into some kind of product, and performing printing on the face WF is one of a series of processes for manufacturing this product. The size, shape, etc. of the workpiece W is not limited to the example illustrated in FIG. 1. The workpiece W may have any size, shape, etc. For example, the surface of the workpiece W may have any face such as a flat surface, a stepped surface, or an irregular surface, etc. For example, although the face WF in the example illustrated in FIG. 1 is a curved convex surface as viewed in the Z2 direction, it may be a curved concave surface as viewed in the Z2 direction. The orientation in which the workpiece W is placed is also not limited to the example illustrated in FIG. 1. The workpiece W may be placed in any orientation.

In the example illustrated in FIG. 1, the three-dimensional object printing apparatus 100 is an ink-jet printer that uses a Cartesian coordinate robot that moves on two orthogonal axes. Specifically, as illustrated in FIG. 1, the three-dimensional object printing apparatus 100 includes a moving mechanism 200, four liquid ejecting units 300, a light emitting unit 380, a liquid supplying unit 400, a controller 600, and a workpiece supporting mechanism 900. The four liquid ejecting units 300 are liquid ejecting units 300_1 to 300_4. In the description below, each of the liquid ejecting units 300_1 to 300_4 may be referred to as "liquid ejecting unit 300". A brief explanation of the components of the three-dimensional object printing apparatus 100 illustrated in FIG. 1 will now be given below in sequence.

The moving mechanism 200 changes the relative position of the liquid ejecting units 300 and the light emitting unit 380 in relation to the workpiece W. The moving mechanism 200 includes a linear motion mechanism 220, an up-and-down mechanism 230, and a supporting portion 280.

Figure 4:
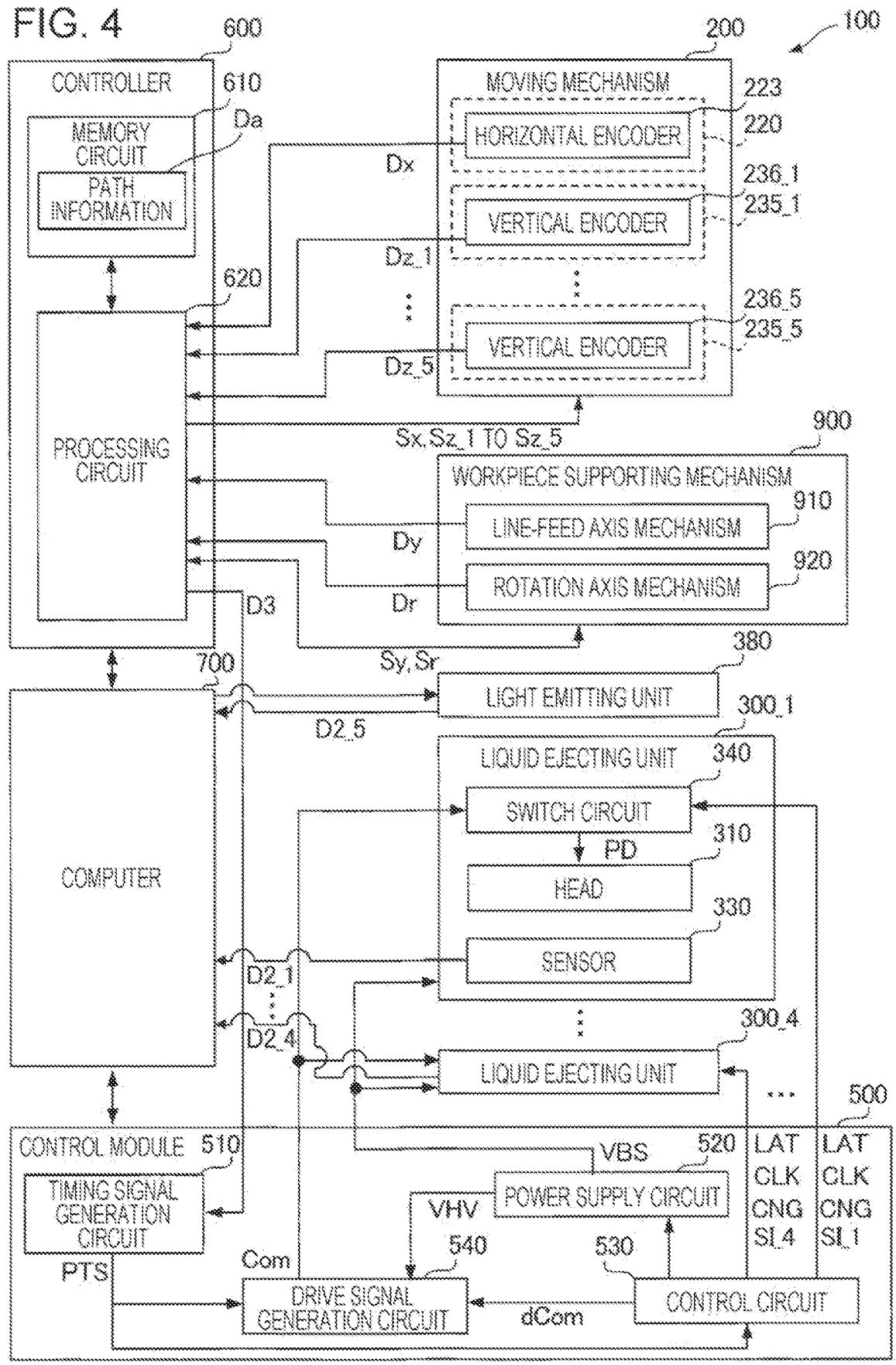
FIG. 4 is a block diagram that illustrates the electric configuration of the three-dimensional object printing apparatus according to the first embodiment.

The linear motion mechanism 220 changes the relative position of the four liquid ejecting units 300 and the light emitting unit 380 in relation to the workpiece W along the X axis. The linear motion mechanism 220 includes a rail member 221 and a carriage 222. The rail member 221 is a low-profile member for movement of the carriage 222 along the X axis. Two rails RA are provided on the Z1-side surface of the rail member 221 along the X axis. The two rails RA extend along the X axis. The carriage 222 is in engagement with the rails RA in such a way as to be able to slide thereon. Though not illustrated in the drawings, a driving mechanism that causes the carriage 222 to move is provided on the linear motion mechanism 220. The driving mechanism includes, for example, a motor that generates a driving force for the movement, a speed reducer that outputs the driving force with a reduction in speed, and a horizontal encoder 223 that detects the operation amount of the movement. The horizontal encoder 223 is illustrated in FIG. 4.

The X axis is an example of "first axis".

The up-and-down mechanism 230 causes the four liquid ejecting units 300 and the light emitting unit 380 to move along the Z axis. The up-and-down mechanism 230 includes a supporting plate 231 and five individual up-and-down mechanisms 235. The five individual up-and-down mechanisms 235 are individual up-and-down mechanisms 235_1 to 235_5. In the description below, each of the individual up-and-down mechanisms 235_1 to 235_5 may be referred to as "individual up-and-down mechanism 235". Suffix notation "x" will be used below, where appropriate, for an element of the individual up-and-down mechanism 235, where x is an integer from 1 to 5.

Figure 2:
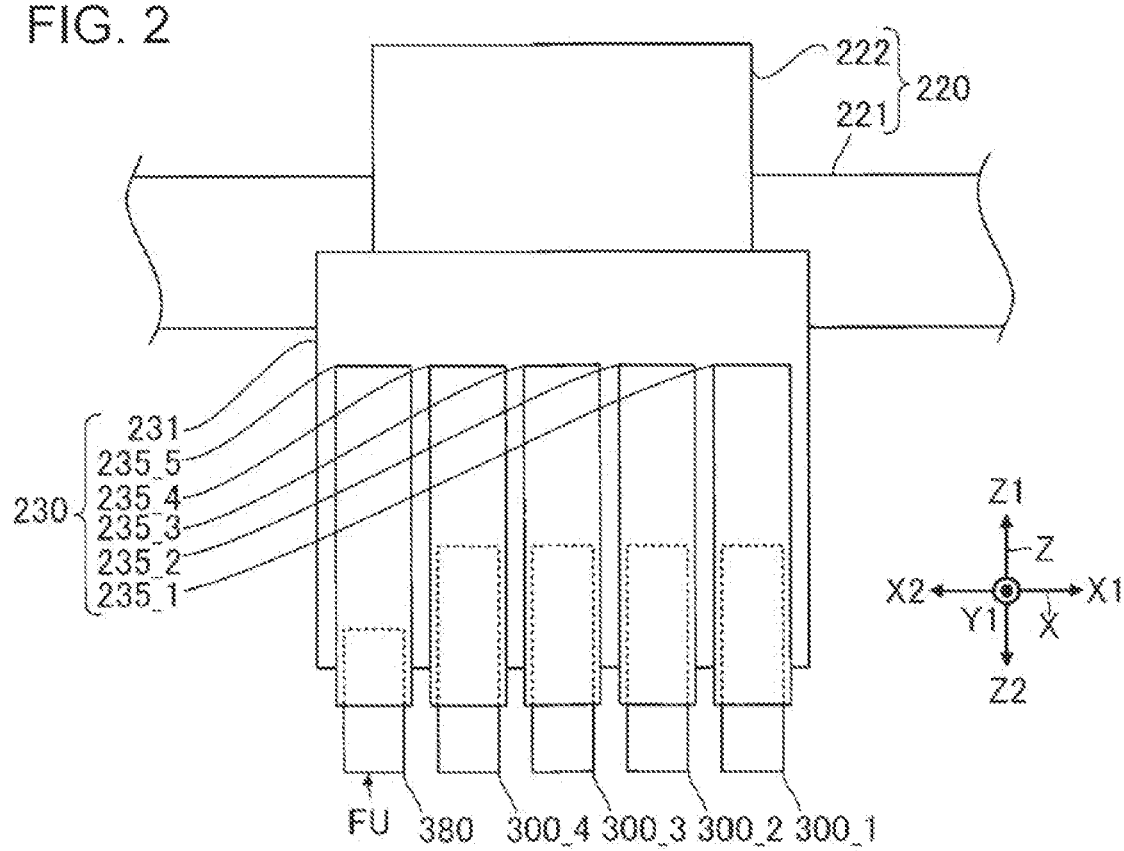
FIG. 2 is a diagram for explaining a relationship between an up-and-down mechanism and liquid ejecting units and a light emitting unit.

With reference to FIG. 2, a relationship between the up-and-down mechanism 230 and the liquid ejecting units 300 and the light emitting unit 380 will now be explained.

FIG. 2 is a diagram for explaining a relationship between the up-and-down mechanism 230 and the liquid ejecting units 300 and the light emitting unit 380. The up-and-down mechanism 230, including its neighborhood, viewed in the direction from Y1 to Y2 is illustrated in FIG. 2.

The supporting plate 231 supports the individual up-and-down mechanisms 235 and is fixed to the carriage 222. The supporting plate 231 fixed to the carriage 222 also moves along the X axis when carriage 222 moves along the X axis. However, instead of the supporting plate 231, the up-and-down mechanism 230 may include a mechanism that causes the four liquid ejecting units 300 and the light emitting unit 380 to move together along the Z axis.

The Z axis is an example of "second axis".

Each one individual up-and-down mechanism 235 causes, among the four liquid ejecting units 300 and the light emitting unit 380, the corresponding one to move along the Z axis. The individual up-and-down mechanisms 235 are fixed to the supporting plate 231. The liquid ejecting units 300, each as an end effector, are mounted on the Z2-side ends of four of the five individual up-and-down mechanisms 235 respectively, in a state of being fastened with screws, etc. The light emitting unit 380, as another end effector, is mounted on the Z2-side end of the remaining one of the five individual up-and-down mechanisms 235, in a state of being fastened with screws, etc. Though not illustrated in the drawings, a driving mechanism that causes the liquid ejecting unit 300 or the light emitting unit 380 to move with respect to the individual up-and-down mechanism 235 is provided on the individual up-and-down mechanism 235. The driving mechanism includes, for example, a motor that generates a driving force for the movement, a speed reducer that outputs the driving force with a reduction in speed, and a vertical encoder 236 that detects the operation amount of the movement. The vertical encoder 236 is illustrated in FIG. 4.

More specifically, the liquid ejecting unit 300_$k$ is mounted on the individual up-and-down mechanism 235_$k$, where k is an integer from 1 to 4. The light emitting unit 380 is mounted on the individual up-and-down mechanism 235_5. The individual up-and-down mechanisms 235_1 to 235_5 are arranged in the order of 235_1, 235_2, 235_3, 235_4, and 235_5 in the direction from X1.

One of any two of the individual up-and-down mechanisms 235_1 to 235_4 is an example of "first up-and-down mechanism". The other of the two is an example of "third up-and-down mechanism". The individual up-and-down mechanism 235_5 is an example of "second up-and-down mechanism".

Referring back to FIG. 1, description is continued. The supporting portion 280 supports the linear motion mechanism 220 and the workpiece supporting mechanism 900. The supporting portion 280 includes a workbench 281 and support pillars 283. The workbench 281 has a top panel 282. The workpiece supporting mechanism 900 is fixed on the top panel 282. The workbench 281 is fastened with screws, etc. to an installation plane such as a floor facing in the Z1 direction. The installation plane to which the workbench 281 is fixed is not limited to the example illustrated in FIG. 1. For example, the workbench 281 may be fixed to a wall, the surface of a wheeled platform, or the like. The support pillars 283 are columnar members that support the linear motion mechanism 220 and extend along the Z axis.

The liquid ejecting unit 300 ejects ink, which is an example of "liquid", toward the workpiece W. The light emitting unit 380 has an emission face FU from which light for curing the ink having been ejected from the liquid ejecting unit 300 is emitted. More particularly, the light emitting unit 380 includes a light source that emits light for curing the ink and a sensor that detects the relative position of the light emitting unit 380 in relation to the workpiece W along the Z axis. Specifically, the sensor of the light emitting unit 380 is a distance sensor such as an optical displacement meter that measures a distance between it and a non-illustrated reference face the relative position of which in relation to the workpiece W is fixed. The reference face may be the surface of the workpiece W. The reference face may be the surface of an object other than the workpiece W. The direction in which the reference face is oriented may be any direction as long as position and orientation in relation to the face WF of the workpiece W is known in advance.

The light emitting unit 380 is an example of "energy emitter". The light for curing the ink is an example of "energy for curing the liquid".

In the present embodiment, the ink is curable ink using curable resin such as ultraviolet curing resin. However, the curable ink is not limited to ultraviolet curable ink. For example, any of thermosetting ink, photo-curable ink, radiation-curable ink, electron-beam-curable ink, and the like, may be used.

The ink is not limited to a solution and may be formed by dispersion of a colorant or the like as a dispersoid in a dispersion medium. The ink is not limited to ink containing a colorant. For example, the ink may contain, as a dispersoid, conductive particles such as metal particles for forming wiring lines, etc. Alternatively, the ink may be clear ink, or a treatment liquid for surface treatment of the workpiece W. The present embodiment will be further described based on an assumption that the three-dimensional object printing apparatus 100 uses four kinds of ink, specifically, ink containing a cyan colorant, ink containing a magenta colorant, ink containing a yellow colorant, and ink containing a black colorant, and on an assumption that the light emitting unit 380 emits ultraviolet light. Since these four kinds of ink are used, in the present embodiment, the three-dimensional object printing apparatus 100 includes four liquid ejecting units 300. However, the number of the liquid ejecting units 300 is not limited to four. The three-dimensional object printing apparatus 100 may include one liquid ejecting unit 300, or two, three, five or more liquid ejecting units 300. The number of the kinds of ink used is not limited to four. Two, three, five or more kinds of ink may be used.

The liquid ejecting unit 300_1 to 300_4 have heads 310_1 to 310_4 respectively. To the head 310_1 to 310_4 of each liquid ejecting unit 300_1 to 300_4, ink containing a colorant of the corresponding one among cyan, magenta, yellow, and black is supplied. Any of these four kinds of ink, each as the corresponding color, may be supplied to the head 310_1 to 310_4. However, since droplets of ejected ink having landed onto the face WF of the workpiece W tend to spread thereon, if ink having a color the lightness of which is significantly different from the lightness of the workpiece W spreads on the face WF of the workpiece W, the spreading of the ink will be conspicuous and therefore will result in a decrease in print quality. The print target medium in three-dimensional printing quite often has non-absorbing property, and, moreover, droplets of ejected ink having landed onto the face WF are prone to move because the face WF has a slope; therefore, bleeding is prone to occur. The color the lightness of which is significantly different from the lightness of the workpiece W is, for example, black when the color of the workpiece W is white. Therefore, it is preferable if ink having a color the lightness of which is least significantly different from the lightness of the workpiece W is supplied to the head 310_1 remotest from the light emitting unit 380 and if ink having a color the lightness of which is most significantly different from the lightness of the workpiece W is supplied to the head 310_4 closest to the light emitting unit 380.

Figure 3:
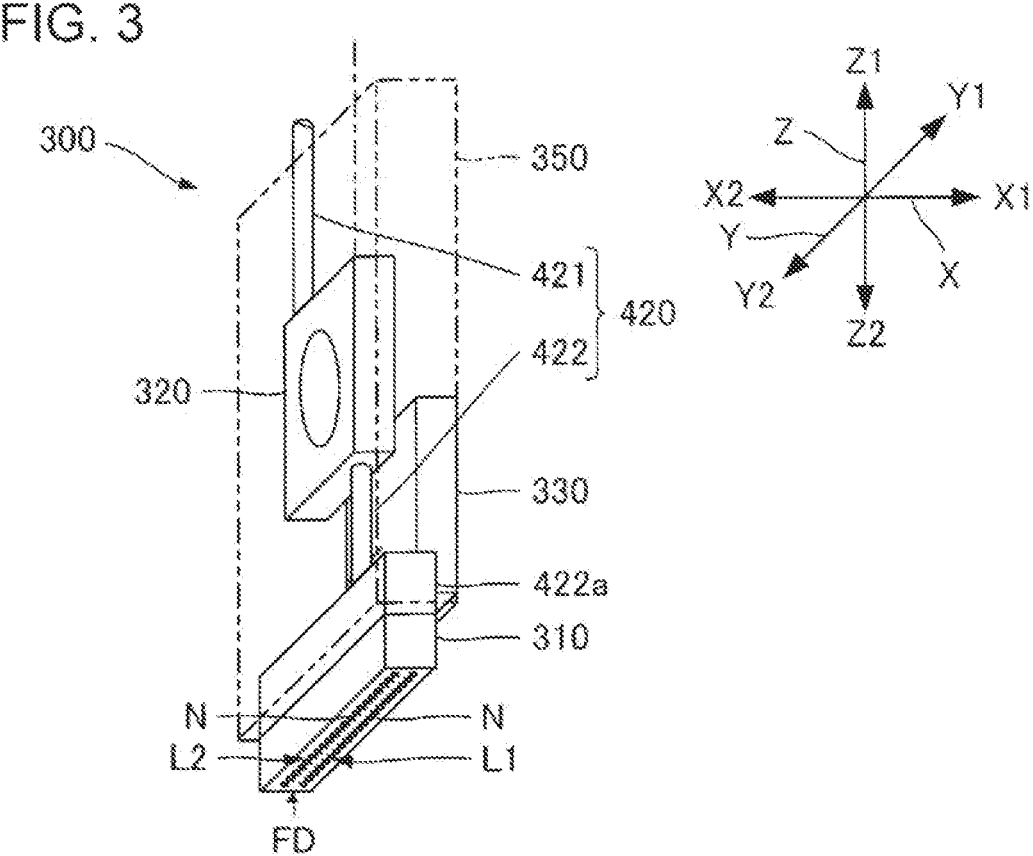
FIG. 3 is a perspective view of a schematic structure of a liquid ejecting unit.

In printing using ultraviolet curable ink, there exists a technique called as pinning, which is a method for curing ink incompletely by, immediately after the landing of droplets of the ink onto a workpiece, applying ultraviolet light thereto. Since the fluidity of ink that is in an incompletely-cured state decreases, it is possible to adjust dot size by suppressing the spreading of droplets of ink having landed onto the face WF of the workpiece W using the pinning method. In the description below, ultraviolet light applied immediately after the landing of droplets of ink for curing the ink incompletely will be referred to as "pinning light", and ultraviolet light applied for curing the ink substantially completely will be referred to as "full curing light". The amount of energy applied to ink by full curing light is larger than the amount of energy applied to ink by pinning light. The light emitting unit 380 includes a light source that emits ultraviolet light. The intensity of ultraviolet light emitted from the light emitting unit 380 may be adjustable depending on the use of pinning light and full curing light. The light emitting unit 380 may include a light source that emits pinning light and a light source that emits full curing light. The amount of energy applied to ink may be adjusted depending on the use of pinning light and full curing light by adjusting the irradiation time of ultraviolet light appropriately. In the description below, pinning light and full curing light might be collectively referred to as "ultraviolet light". With reference to FIG. 3, the liquid ejecting unit 300 will now be explained in detail.

FIG. 3 is a perspective view of a schematic structure of the liquid ejecting unit 300. The liquid ejecting unit 300 includes a head 310, a pressure adjustment valve 320, and a sensor 330. These components are supported by a support member 350 indicated by alternate-long-and-two-short-dashes-line illustration in FIG. 3.

The head 310 includes a plurality of non-illustrated piezoelectric elements, a plurality of non-illustrated cavities, and a plurality of nozzles N. The cavities are configured to contain ink. Each of the nozzles N is provided for the corresponding one of the cavities and is in communication with this one of the cavities. Each of the piezoelectric elements is provided for the corresponding one of the cavities and causes a change in pressure inside this one of the cavities. Due to the change in pressure, ink is ejected from the nozzle N corresponding to this one of the cavities. Instead of the piezoelectric element, a heater that heats ink inside the cavity may be used as a drive element for ejecting ink from the nozzle. The direction in which ink is ejected by the head 310 under ideal conditions is the Z2 direction. Therefore, the direction in which the liquid ejecting unit 300 is moved by the individual up-and-down mechanism 235 and the direction in which ink is ejected by the head 310 are substantially parallel to each other. The concept of "substantially parallel" does not preclude a deviation of ±5° or so, including mechanical errors and errors arising in ink ejection.

The head 310 has a nozzle face FD in which the plurality of nozzles N is provided. In the example illustrated in FIG. 3, the direction of a line normal to the nozzle face FD is the Z1 direction, and the plurality of nozzles N can be grouped into a first nozzle row L1 and a second nozzle row L2, which are arranged next to each other, with an interval in the direction along the X axis therebetween. Each of the first nozzle row L1 and the second nozzle row L2 is a group of nozzles N arranged linearly in the direction along the Y axis. The head 310 has a structure in which elements related to the nozzles N belonging to the first nozzle row L1 and elements related to the nozzles N belonging to the second nozzle row L are substantially symmetric to each other in the direction along the X axis.

Among the liquid ejecting units 300_1 to 300_4, the head 310 included in the liquid ejecting unit 300 mounted on the individual up-and-down mechanism 235 corresponding to the "first up-and-down mechanism" is an example of "first head", and the nozzle face FD of this one of the heads 310 is an example of "first nozzle face". The head 310 included in the liquid ejecting unit 300 mounted on the individual up-and-down mechanism 235 corresponding to the "third up-and-down mechanism" is an example of "second head", and the nozzle face FD of this one of the heads 310 is an example of "second nozzle face".

The positions of the nozzles N belonging to the first nozzle row L1 and the positions of the nozzles N belonging to the second nozzle row L2 may be the same as one another, or different from one another, in the direction along the Y axis. Elements related to the respective nozzles N of either the first nozzle row L1 or the second nozzle row L2 may be omitted. In the example described below, the positions of the nozzles N belonging to the first nozzle row L1 and the positions of the nozzles N belonging to the second nozzle row L2 are the same as one another in the direction along the Y axis.

The pressure adjustment valve 320 is a valve mechanism that opens and closes in accordance with the pressure of ink inside the head 310. The opening and closing of this valve mechanism keeps the pressure of ink inside the head 310 within a predetermined negative pressure range. Keeping such negative ink pressure stabilizes ink meniscus formed in each nozzle N of the head 310.

The sensor 330 detects the relative position of the head 310 in relation to the workpiece W along the Z axis. Specifically, the sensor 330 is a distance sensor such as an optical displacement meter that measures a distance between it and a non-illustrated reference face the relative position of which in relation to the workpiece W is fixed.

The support member 350 is made of, for example, a metal material, and is substantially rigid. In FIG. 3, the support member 350 has a low-profile box-like shape. However, the support member 350 may have any shape, without being limited to the illustrated example. The support member 350 is mounted on the Z2-directional side of the individual up-and-down mechanism 235.

In the example illustrated in FIG. 3, the pressure adjustment valve 320 is located at a relatively Z1-side position with respect to the head 310. The sensor 330 is located at a relatively X1-side position with respect to the head 310.

The supply flow passage 420 is demarcated into an upstream flow passage 421 and a downstream flow passage 422 by the pressure adjustment valve 320. That is, the supply flow passage 420 includes the upstream flow passage 421, which is a passage for communication between a liquid containing portion 410 and the pressure adjustment valve 320, and the downstream flow passage 422, which is a passage for communication between the pressure adjustment valve 320 and the head 310. In the example illustrated in FIG. 3, a part of the downstream flow passage 422 of the supply flow passage 420 is configured as a flow passage member 422a. The flow passage member 422a has a branching-passage structure through which ink flowing from the pressure adjustment valve 320 is distributed to a plurality of passages in the head 310.

Referring back to FIG. 1, description is continued. The liquid supplying unit 400 is a mechanism for supplying ink to the head 310. The liquid supplying unit 400 includes the liquid containing portion 410 and the supply flow passage 420.

The liquid containing portion 410 is a container that contains ink. The liquid containing portion 410 is, for example, a bag-type ink pack made of a flexible film material.

In the example illustrated in FIG. 1, the liquid containing portion 410 is fixed to a wall, a ceiling, a pillar, or the like to ensure that it is always located at a relatively Z1-side position in comparison with the position of the head 310. That is, in the vertical direction, the liquid containing portion 410 is located above the movement area of the head 310. Therefore, it is possible to supply ink from the liquid containing portion 410 to the head 310 at a predetermined level of pressure without any need for using a pump or the like.

The supply flow passage 420 is a flow passage through which ink is supplied from the liquid containing portion 410 to the head 310. The pressure adjustment valve 320 is provided somewhere between the ends of the supply flow passage 420. Therefore, even when a positional relationship between the head 310 and the liquid containing portion 410 changes due to operation performed by the moving mechanism 200, it is possible to reduce a change in pressure of ink inside the head 310.

The controller 600 is a robot controller that controls the driving or movement of the moving mechanism 200 and the workpiece supporting mechanism 900. Though not illustrated in FIG. 1, a control module for controlling ejection performed by the liquid ejecting unit 300 is electrically coupled to the controller 600. A computer is connected to the controller 600 and the control module in such a way as to be able to communicate therewith. The control module described here corresponds to a control module 500 illustrated in FIG. 4. The control module 500 will be described later. The computer described here corresponds to a computer 700 illustrated in FIG. 4. The computer 700 will be described later.

The workpiece supporting mechanism 900 supports the workpiece W and changes either one or both of the position and orientation of the workpiece W. The workpiece supporting mechanism 900 includes a line-feed axis mechanism 910 and a rotation axis mechanism 920. The line-feed axis mechanism 910 includes a low-profile member for movement of the workpiece W along the Y axis. Two rails RB are provided on the Z1-side surface of this member along the Y axis. The two rails RB extend along the Y axis.

The rotation axis mechanism 920 is able to rotate around a rotation axis XR extending along the X axis. The rotation axis mechanism 920 includes a placement tabletop 922. The workpiece W can be placed on the placement tabletop 922.

The direction in which the placement tabletop 922 is oriented changes when the rotation axis mechanism 920 rotates. The orientation of the workpiece W placed on the placement tabletop 922 changes when the direction in which the placement tabletop 922 is oriented changes.

1-2. Electric Configuration of Three-Dimensional Object Printing Apparatus

FIG. 4 is a block diagram that illustrates the electric configuration of the three-dimensional object printing apparatus 100 according to the first embodiment. In FIG. 4, among the components of the three-dimensional object printing apparatus 100, electric components are illustrated. In FIG. 4, the horizontal encoder 223 and the vertical encoders 236_1 to 236_5 are also illustrated.

As illustrated in FIG. 4, the three-dimensional object printing apparatus 100 includes the control module 500 and the computer 700, besides the moving mechanism 200, the liquid ejecting units 300, the controller 600, and the workpiece supporting mechanism 900 described earlier. Before giving an explanation of the control module 500 and the computer 700, the controller 600 will now be explained first.

Any of electric components described below may be split into two or more subcomponents as needed. A part of one electric component described below may be included in another one. One electric component described below may be integrated with another one.

The controller 600 has a function of controlling the driving or movement of the moving mechanism 200, a function of controlling the driving or movement of the workpiece supporting mechanism 900, and a function of generating a signal D3 for synchronizing the ejection of ink by the liquid ejecting unit 300 with the operation of the moving mechanism 200. The controller 600 includes a memory circuit 610 and a processing circuit 620.

The memory circuit 610 stores various programs that are to be run by the processing circuit 620 and various kinds of data that are to be processed by the processing circuit 620.

Path information Da is stored in the memory circuit 610. The path information Da is information indicating a movement path CR along which the heads 310 and the light emitting unit 380 are to move. The path information Da is expressed using, for example, the coordinate values of the aforementioned base coordinate system. The path information Da is determined based on workpiece information that indicates the position and shape of the workpiece W. The workpiece information is obtained by associating information such as CAD (computer-aided design) data that indicates the three-dimensional shape of the workpiece W with the aforementioned base coordinate system. The path information Da described above is inputted from the computer 700 into the memory circuit 610.

Based on the path information db, the processing circuit 620 controls the operation of the linear motion mechanism 220, the up-and-down mechanism 230, the line-feed axis mechanism 910, and the rotation axis mechanism 920, and generates the signal D3. Specifically, the processing circuit 620 performs a computation for converting the path information Da into the amount of operation such as the position and speed, etc. of the linear motion mechanism 220 and the up-and-down mechanism 230 and a computation for converting the path information Da into the amount of operation such as the position and speed, etc. of the line-feed axis mechanism 910 and the rotation axis mechanism 920. Then, based on an output signal Dx from the horizontal encoder 223 and output signals Dz_1 to Dz_5 from the vertical encoders 236_1 to 236_5, the processing circuit 620 outputs control signals Sx and Sz_1 to Sz_5 such that the amount of operation of the linear motion mechanism 220 and the up-and-down mechanism 230 will be equal to the result of the computation mentioned here. The control signal Sx is a signal for controlling the driving of the motor of the linear motion mechanism 220. The control signal Sz_k is a signal for controlling the driving of the motor of the individual up-and-down mechanism 235_k, where k is an integer from 1 to 5. In the description below, each of the output signals Dz_1 to Dz_5 may be referred to as "output signal Dz".

Similarly, based on an output signal Dy from an encoder included in the line-feed axis mechanism 910 and an output signal Dr from an encoder included in the rotation axis mechanism 920, the processing circuit 620 outputs control signals Sy and Sr such that the amount of operation of the line-feed axis mechanism 910 and the rotation axis mechanism 920 will be equal to the result of the computation mentioned here. The control signal Sy is a signal for controlling the driving of the motor of the line-feed axis mechanism 910. The control signal Sr is a signal for controlling the driving of the motor of the rotation axis mechanism 920.

Based on one or more of the output signals Dx, Dz_1 to Dz_5, Dy, and Dr, the processing circuit 620 generates the signal D3. For example, based on one of the output signals Dx, Dz_1 to Dz_5, Dy, and Dr, the processing circuit 620 generates the signal D3. As another example, the processing circuit 620 generates, as the signal D3, a signal that includes a pulse at a point in time at which one of the output signals Dx, Dz_1 to Dz_5, Dy, and Dr becomes a predetermined value.

The control module 500 is a circuit that controls, based on the signal D3 outputted from the controller 600 and print data Img outputted from the computer 700, the ejecting operation of the head 310. The control module 500 includes a timing signal generation circuit 510, a power supply circuit 520, a control circuit 530, and a drive signal generation circuit 540.

Based on the signal D3, the timing signal generation circuit 510 generates a timing signal PTS. The signal D3 serves as a trigger signal that specifies when to start the ejection of ink by the liquid ejecting unit 300.

The power supply circuit 520 receives power supply from a commercial power source that is not illustrated, and generates various predetermined potentials. The various potentials generated by the power supply circuit 520 are supplied to the components, etc. of the three-dimensional object printing apparatus 100.

Based on the timing signal PTS, the control circuit 530 generates control signals SI_1 to SI_4, a waveform specifying signal dCom, a latch signal LAT, a clock signal CLK, and a change signal CNG. These signals are in synchronization with the timing signal PTS. Among these signals, the waveform specifying signal dCom is inputted into the drive signal generation circuit 540. The rest of them are inputted into switch circuits 340 of the liquid ejecting units 300. The control signal SI_k is a signal supplied to the switch circuit 340 of the liquid ejecting unit 300_k, where k is an integer from 1 to 4. In the description below, each of the control signals SI_1 to SI_4 might be referred to as "control signal SI".

The control signal SI is a digital signal for specifying the operation state of each piezoelectric element of the head 310. Specifically, the control signal SI specifies whether to supply a drive signal Com, which will be described later, to the piezoelectric element or not. The latch signal LAT and the change signal CNG are used together with the control signal SI and specify the timing of ejection of ink from the nozzle N by specifying the drive timing of the piezoelectric element. The clock signal CLK serves as a reference clock that is in synchronization with the timing signal PTS. Among the signals described above, signals that are inputted into the switch circuit 340 of each liquid ejecting unit 300 will be described in detail later.

The drive signal generation circuit 540 is a circuit that generates the drive signal Com for driving each piezoelectric element of the head 310. Specifically, the drive signal generation circuit 540 includes, for example, a DA conversion circuit and an amplification circuit. In the drive signal generation circuit 540, the DA conversion circuit converts the format of the waveform specifying signal dCom supplied from the control circuit 530 from a digital signal into an analog signal, and the amplification circuit amplifies the analog signal by using the power potential VHV supplied from the power supply circuit 520, thereby generating the drive signal Com. A signal having a waveform that is supplied actually to the piezoelectric element, as a part of the waveform included in the drive signal Com, serves as a drive pulse PD. The drive pulse PD is supplied from the drive signal generation circuit 540 to the piezoelectric element via the switch circuit 340. Based on the control signal SI, the switch circuit 340 switches whether or not to supply at least a part of the waveform included in the drive signal Com as the drive pulse PD.

The computer 700 has a function of supplying information such as the path information Da to the controller 600, a function of supplying information such as the print data Img to the control module 500, and a function of controlling the driving of the light emitting unit 380. For example, a personal computer can be used as the computer 700.

Figure 5:
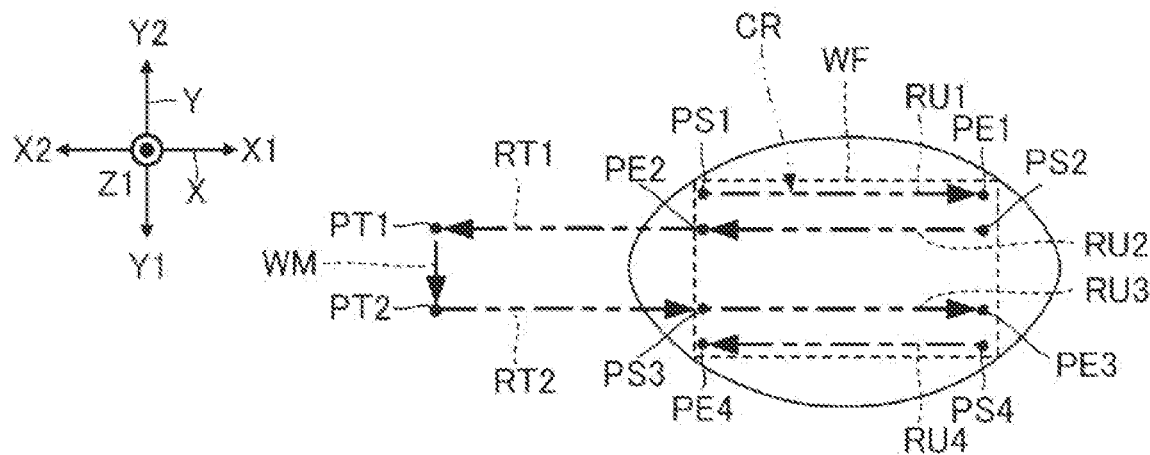
FIG. 5 is a diagram for explaining path information according to the first embodiment.

1-3. Operation of Three-Dimensional Object Printing Apparatus 100, and Three-Dimensional Object Printing Method FIG. 5 is a diagram for explaining the path information Da according to the first embodiment. FIG. 5 depicts a state in which the movement path CR, indicated by the path information Da, of the heads 310 and the light emitting unit 380 with respect to the workpiece W is viewed in the direction from Z1 to Z2. In the first embodiment, the three-dimensional object printing apparatus 100 executes a first scan RU1, a second scan RU2, retracting operation RT1, workpiece moving operation WM, returning operation RT2, a third scan RU3, and a fourth scan RU4 in this order. As described here, the retracting operation RT1, the workpiece moving operation WM, and the returning operation RT2 are executed during a period between the second scan RU2 and the third scan RU3. A set of moving operations including moving the heads 310 and the light emitting unit 380 in the direction from X2 to X1 and next moving the heads 310 and the light emitting unit 380 in the direction from X1 to X2 will be referred to as "pass". In the present embodiment, the first scan RU1 and the second scan RU2 constitute one pass, and the third scan RU3 and the fourth scan RU4 constitute another one pass. As described here, the three-dimensional object printing apparatus 100 executes two passes in the present embodiment. However, the three-dimensional object printing apparatus 100 may execute a single pass only, or three or more passes.

In FIG. 5, for clear illustration of the first scan RU1 and the second scan RU2, the trajectory of the first scan RU1 and the trajectory of the second scan RU2 are illustrated with some distance from each other along the Y axis. However, actually, the start position PS1 of the first scan RU1 is substantially the same as the end position PE2 of the second scan RU2, the end position PE1 of the first scan RU1 is substantially the same as the start position PS2 of the second scan RU2, and the trajectory of the first scan RU1 is substantially the same as the trajectory of the second scan RU2. The concept of "substantially the same" herein includes not only a case of being perfectly the same but also a case of being able to be deemed as the same, with a margin of manufacturing error taken into consideration. However, the start position PS1 of the first scan RU1 may be different from the end position PE2 of the second scan RU2, the end position PE1 of the first scan RU1 may be different from the start position PS2 of the second scan RU2, and the trajectory of the first scan RU1 may be different from the trajectory of the second scan RU2. Similarly, though the trajectory of the third scan RU3 and the trajectory of the fourth scan RU4 are illustrated with some distance from each other along the Y axis, actually, the start position PS3 of the third scan RU3 is substantially the same as the end position PE4 of the fourth scan RU4, the end position PE3 of the third scan RU3 is substantially the same as the start position PS4 of the fourth scan RU4, and the trajectory of the third scan RU3 is substantially the same as the trajectory of the fourth scan RU4. As for the concept of "substantially the same" and as for non-limitation thereto, the same holds true for the third scan RU3 and the fourth scan RU4, as described above for the first scan RU1 and the second scan RU2.

Each of the first scan RU1 and the third scan RU3 is moving operation for changing, in the X1 direction, the relative position of the heads 310 and the light emitting unit 380 in relation to the workpiece W. Each of the second scan RU2 and the fourth scan RU4 is moving operation for changing, in the X2 direction, the relative position of the heads 310 and the light emitting unit 380 in relation to the workpiece W. In the present embodiment, the workpiece supporting mechanism 900 is not driven during the execution of the first scan RU1, the second scan RU2, the third scan RU3, and the fourth scan RU4. However, the workpiece supporting mechanism 900 may be driven during the execution of any of the first scan RU1, the second scan RU2, the third scan RU3, and the fourth scan RU4.

The X1 direction is an example of "first direction". The X2 direction is an example of "third direction".

The retracting operation RT1 is moving operation for changing the relative position of the heads 310 and the light emitting unit 380 in relation to the workpiece W from the end position PE2 of the second scan RU2 to a retraction position PT1, which is a position where the nozzle face FD and the emission face FU do not overlap with the workpiece W when viewed in the direction along the Z axis. The workpiece moving operation WM is operation for changing either one or both of the position and orientation of the workpiece W. When it is described herein that two objects overlap with each other, this description means that a part or a whole of one of the two objects overlaps with a part or a whole of the other thereof. As a result of the change in the position and orientation of the workpiece W, the relative position of the nozzle face FD and the emission face FU in relation to the workpiece W changes from the retraction position PT1 to a retraction position PT2. Also at the retraction position PT2, the nozzle face FD and the emission face FU do not overlap with the workpiece W when viewed in the direction along the Z axis. The returning operation RT2 is moving operation for changing the relative position of the heads 310 and the light emitting unit 380 in relation to the workpiece W from the retraction position PT2 to the start position PS3 of the third scan RU3.

Figure 6:
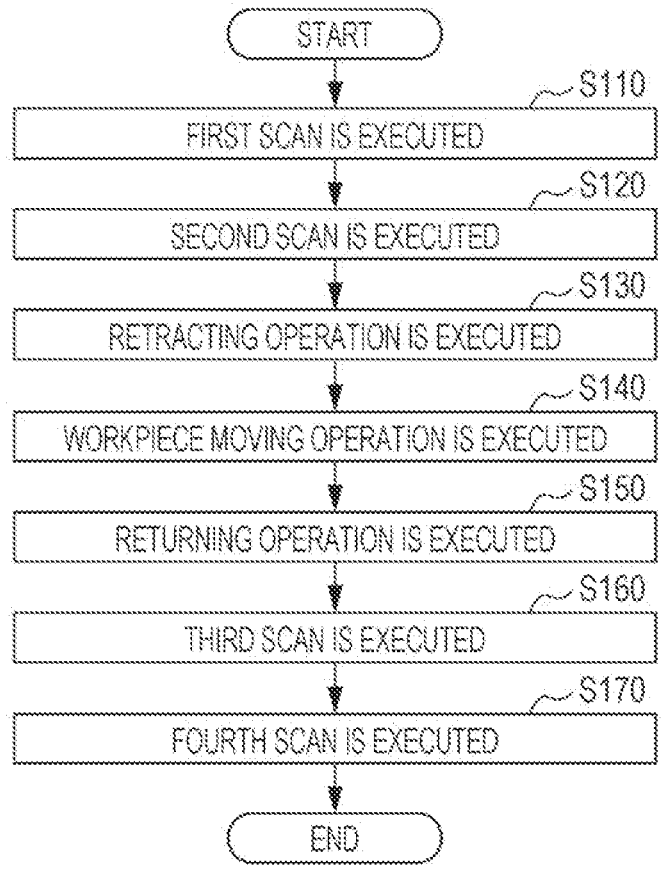
FIG. 6 is a flowchart illustrating the procedure of a three-dimensional object printing method according to the first embodiment.

FIG. 6 is a flowchart illustrating the procedure of a three-dimensional object printing method according to the first embodiment. As illustrated in FIG. 6, the three-dimensional object printing apparatus 100 executes steps S110, S120, S130, S140, S150, S160, and S170 in this order. In the step S110, the first scan RU1 is executed. In the step S120, the second scan RU2 is executed. In the step S130, the retracting operation RT1 is executed. In the step S140, the workpiece moving operation WM is executed. In the step S150, the returning operation RT2 is executed. In the step S160, the third scan RU3 is executed. In the step S170, the fourth scan RU4 is executed. The operations illustrated in FIG. 6 are executed by controlling the moving mechanism 200 and the liquid ejecting units 300 by the computer 700 via the controller 600 and the control module 500.

Figure 7:
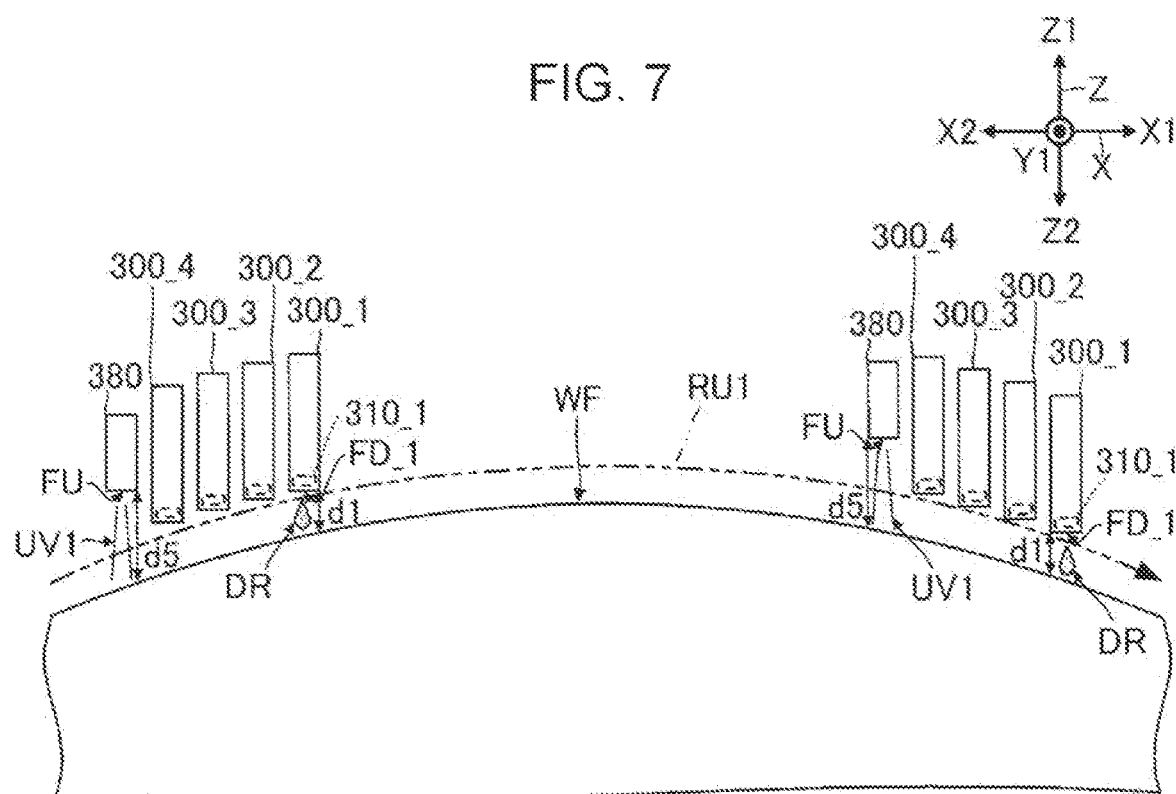
FIG. 7 is a diagram illustrating an example of the position of a nozzle face and the position of an emission face with respect to a workpiece during the execution of a first scan.

During the execution of the first scan RU1 in the step S110, a change in the relative position of the nozzle face FD and the emission face FU occurs due to the movement of one or more of the individual up-and-down mechanisms 235_1 to 235_5. With reference to FIG. 7, a positional relationship between the nozzle face(s) FD and the emission face FU and the workpiece W in the first scan RU1 will now be explained.

Figure 8:
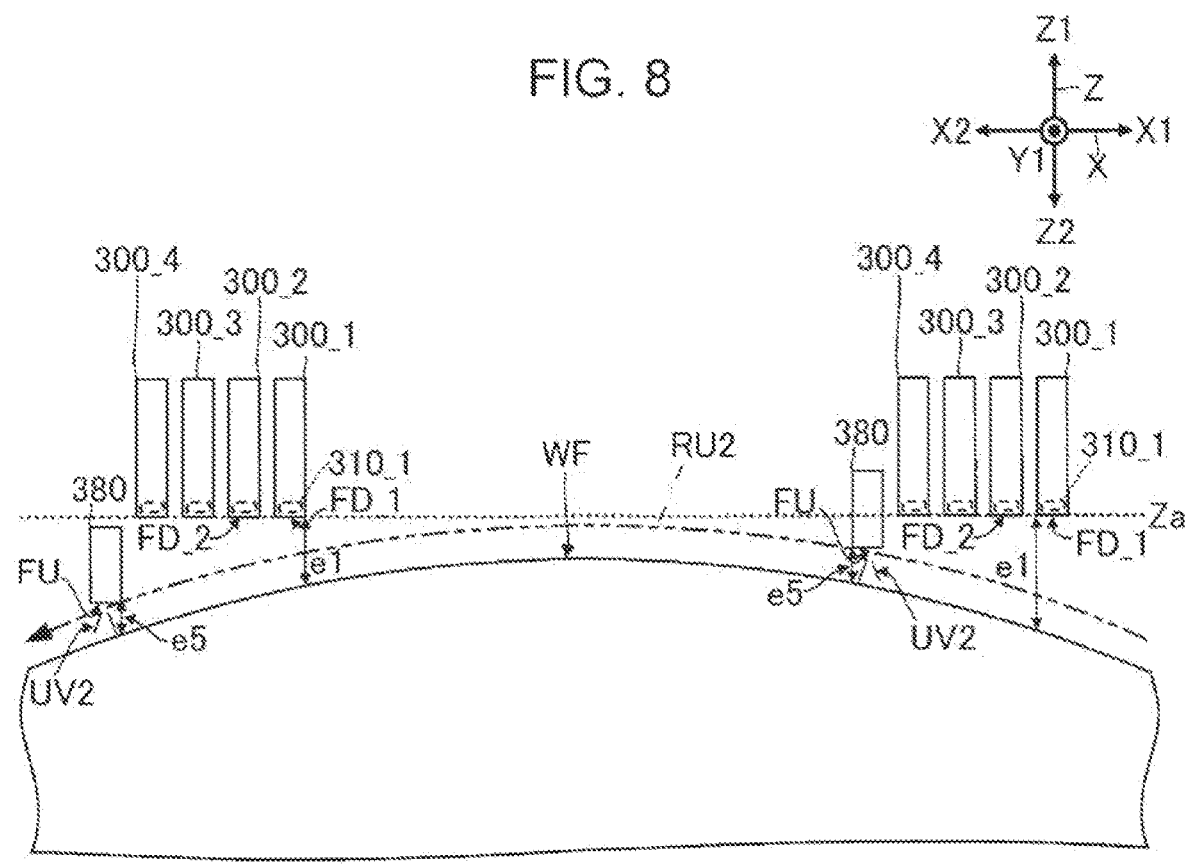
FIG. 8 is a diagram illustrating an example of the position of the nozzle face and the position of the emission face during the execution of a second scan.

FIG. 7 is a diagram illustrating an example of the position of the nozzle face FD and the position of the emission face FU with respect to the workpiece W during the execution of the first scan RU1. In FIGS. 7 and 8, to avoid complexity, the illustration of the heads 310_2 to 310_4, and the nozzle faces FD of the heads 310_2 to 310_4, is omitted. During the execution of the first scan RU1, the head 310 ejects ink toward the workpiece W in accordance with the control signal SI. In FIG. 7, a droplet DR ejected from the head 310 is illustrated. In addition, during the execution of the first scan RU1, the light emitting unit 380 emits pinning light UV1 toward the workpiece W.

In the first scan RU1, driven by the linear motion mechanism 220, the heads 310_1 to 310_4 and the light emitting unit 380 move in the X1 direction. Concurrently with the movement of the linear motion mechanism 220, the individual up-and-down mechanisms 235_1 to 235_4 operate such that the distance between the nozzle face FD and the face WF in the Z2 direction is kept to be a distance dl. The distance between the head 310 and the workpiece W in the Z2 direction will be referred to also as "workpiece gap". Similarly, the individual up-and-down mechanism 235_5 operates such that the distance between the emission face FU and the face WF in the Z2 direction is kept to be a distance d5. As illustrated in FIG. 7, the distance dl is shorter than the distance d5. In the description below, the distance between the light emitting unit 380 and the workpiece W in the Z2 direction also might be referred to as "workpiece gap".

The Z2 direction is an example of "second direction". Unless the workpiece gap of the head 310 is adjusted appropriately, the distance by which a droplet of ink ejected from the head 310 travels in air could be long, which could result in a decrease in the precision of the position where the droplet lands onto the surface of the workpiece. Moreover, unless the workpiece gap of the head 310 is adjusted appropriately, the curing of the ink could be insufficient due to the attenuation of energy emitted from the light emitting unit 380. As described here, the workpiece gap has an influence on the quality of printing.

Referring back to FIG. 6, description is continued. During the execution of the second scan RU2 in the step S120, the individual up-and-down mechanism 235_5 operates, whereas the individual up-and-down mechanisms 235_1 to 235_4 do not operate. With reference to FIG. 8, a positional relationship between the nozzle face(s) FD and the emission face FU and the workpiece W in the second scan RU2 will now be explained.

FIG. 8 is a diagram illustrating an example of the position of the nozzle face FD and the position of the emission face FU during the execution of the second scan RU2. During the execution of the second scan RU2, the head 310 does not eject ink toward the workpiece W. On the other hand, during the execution of the second scan RU2, the light emitting unit 380 emits full curing light UV2 toward the workpiece W. The intensity of the full curing light UV2 is higher than the intensity of the pinning light UV1. By this means, it is possible to sufficiently cure the ink, the droplet of which landed onto the surface of the workpiece when the first scan RU1 was executed. Moreover, it is possible to increase the length of the irradiation time of the full curing light UV2 by making the moving speed of the linear motion mechanism 220 in the second scan RU2 lower than in the first scan RU1, and the longer irradiation makes it possible to sufficiently cure the ink, the droplet of which landed onto the surface of the workpiece when the first scan RU1 was executed.

Since the head 310 ejects no ink during the execution of the second scan RU2, there is no need to keep the distance el between the nozzle face FD and the face WF in the Z2 direction constant. More particularly, no change in relative position of the respective nozzle faces FD of the heads 310 in relation to one another occurs during the execution of the second scan RU2. Moreover, it is preferable if the position of the nozzle face FD of the head 310 in the direction along the Z axis does not change during the execution of the second scan RU2. In the second scan RU2, driven by the linear motion mechanism 220, the heads 310_1 to 310_4 and the light emitting unit 380 move in the X2 direction. The individual up-and-down mechanisms 235_1 to 235_4 operate such that the respective nozzle faces FD of the heads 310 will be at equal position Za in the direction along the Z axis. Specifically, at the start position PS2 of the second scan RU2, the individual up-and-down mechanisms 235_1 to 235_4 operate such that the respective nozzle faces FD of the heads 310 will be at equal position Za in the direction along the Z axis, and then, the movement of the individual up-and-down mechanisms 235_1 to 235_4 keeps stopped until the execution of the second scan RU2 ends. The individual up-and-down mechanism 235_5 operates such that the distance between the emission face FU and the face WF in the Z2 direction is kept to be a distance e5. During the execution of the second scan RU2, the distance e5 is shorter than the distance el.

Referring back to FIG. 6, description is continued. In the retracting operation RT1 executed in the step S130, driven by the linear motion mechanism 220, the heads 310_1 to 310_4 and the light emitting unit 380 move in the X2 direction.

Figure 9:
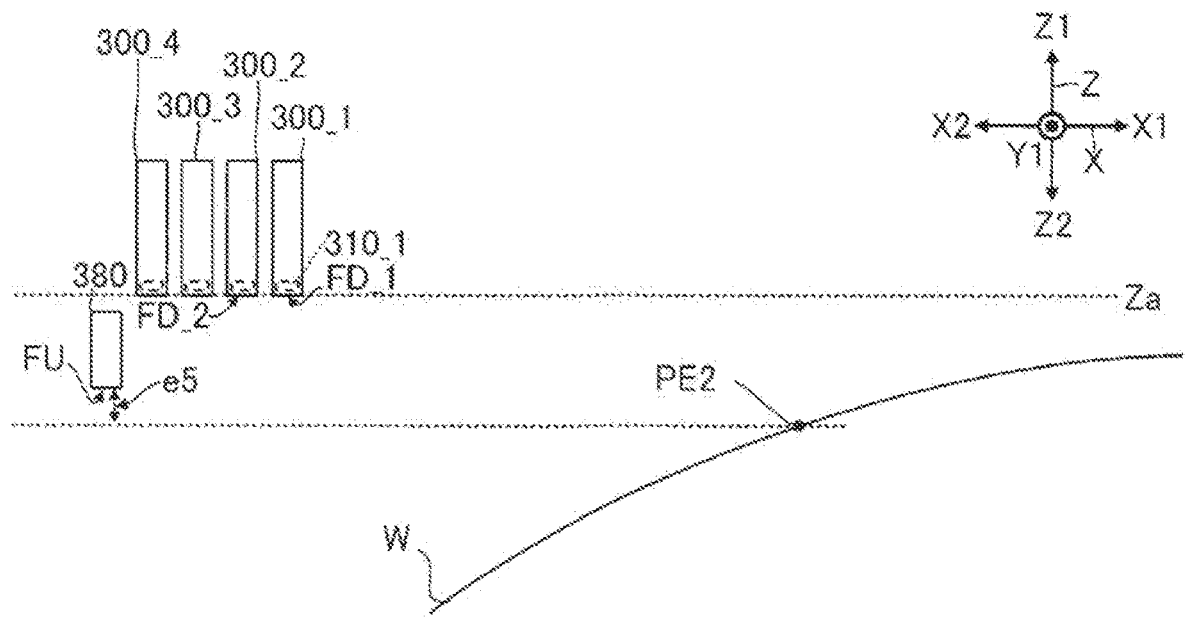
FIG. 9 is a diagram illustrating an example of the position of the nozzle face and the position of the emission face at the point in time of the start of workpiece moving operation.
Figure 10:
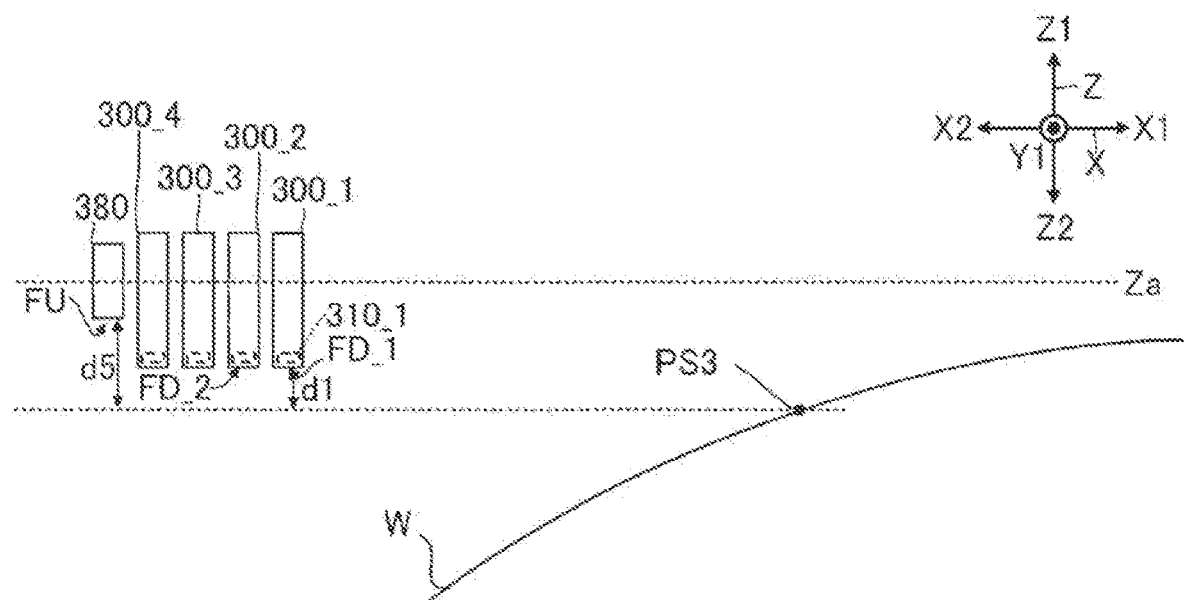
FIG. 10 is a diagram illustrating an example of the position of the nozzle face and the position of the emission face at the point in time of the end of the workpiece moving operation.

In the workpiece moving operation WM executed in the step S140, by movement of the line-feed axis mechanism 910 and the rotation axis mechanism 920, the workpiece supporting mechanism 900 changes either one or both of the position and orientation of the workpiece W. Moreover, in the workpiece moving operation WM, for the purpose of reducing the time that will be taken for executing the third scan RU3, which is to be executed after the workpiece moving operation WM, driven by one or more of the individual up-and-down mechanisms 235_1 to 235_5, one or more, among the nozzle faces FD and the emission face FU, move along the Z axis. With reference to FIGS. 9 and 10, the movement of the nozzle faces FD and the emission face FU in the workpiece moving operation WM will now be explained.

FIG. 9 is a diagram illustrating an example of the position of the nozzle face(s) FD and the position of the emission face FU at the point in time of the start of the workpiece moving operation WM. In the present embodiment, it is assumed that, at the point in time of the start of the workpiece moving operation WM, the positions of the respective nozzle faces FD of the heads 310 and the position of the emission face FU in the direction along the Z axis remain the same as the Z-directional levels where they were at the point in time of the end of the second scan RU2. Specifically, the respective nozzle faces FD of the heads 310 are located at the position Za in the direction along the Z axis. On the other hand, the position of the emission face FU in the direction along the Z axis is a position shifted by the distance e5 in the Z1 direction from the level corresponding to the end position PE2 of the second scan RU2.

FIG. 10 is a diagram illustrating an example of the position of the nozzle face(s) FD and the position of the emission face FU at the point in time of the end of the workpiece moving operation WM. Driven by the individual up-and-down mechanisms 235_1 to 235_5, the nozzle faces FD and the emission face FU move along the Z axis in such a way as to come to the respective Z-directional levels of the nozzle faces FD of the heads 310 and the emission face FU where they should be at the start position PS3 of the third scan RU3. Specifically, driven by the individual up-and-down mechanism 235_1, the head 310_1 moves to a position shifted by the distance dl in the Z1 direction from the level corresponding to the start position PS3 of the third scan RU3. Driven by the individual up-and-down mechanism 235_5, the light emitting unit 380 moves to a position shifted by the distance d5 in the Z1 direction from the level corresponding to the start position PS3.

Referring back to FIG. 6, description is continued. In the returning operation RT2 executed in the step S150, driven by the linear motion mechanism 220, the heads 310_1 to 310_4 and the light emitting unit 380 move in the X1 direction.

During the execution of the third scan RU3 in the step S160, a change in the relative position of the nozzle face FD and the emission face FU occurs due to the movement of one or more of the individual up-and-down mechanisms 235_1 to 235_5. During the execution of the third scan RU3, the head 310 ejects ink toward the workpiece W in accordance with the control signal SI. In addition, during the execution of the third scan RU3, the light emitting unit 380 emits the pinning light UV1 toward the workpiece W. The positional relationship between the nozzle face FD and the emission face FU and the workpiece W in the third scan RU3 is the same as the positional relationship between the nozzle face FD and the emission face FU and the workpiece W in the first scan RU1; therefore, illustration is omitted.

During the execution of the fourth scan RU4 in the step S170, the individual up-and-down mechanism 235_5 operates, whereas the individual up-and-down mechanisms 235_1 to 235_4 do not operate. A change in the relative position of the nozzle face FD and the emission face FU occurs. During the execution of the fourth scan RU4, the head 310 does not eject ink toward the workpiece W. On the other hand, during the execution of the fourth scan RU4, the light emitting unit 380 emits the full curing light UV2 toward the workpiece W. The positional relationship between the nozzle face FD and the emission face FU and the workpiece W in the fourth scan RU4 is the same as the positional relationship between the nozzle face FD and the emission face FU and the workpiece W in the second scan RU2; therefore, illustration is omitted.

1-4. Summary of First Embodiment

The three-dimensional object printing apparatus 100 according to the first embodiment will be further described below using an example in which the individual up-and-down mechanism 235_1 corresponds to "first up-and-down mechanism" and in which the individual up-and-down mechanism 235_2 corresponds to "third up-and-down mechanism".

The three-dimensional object printing apparatus 100 according to the first embodiment includes: the head 310_1 having the nozzle face FD_1 in which the nozzles N for ejecting ink are provided; the light emitting unit 380 having the emission face FU from which light for curing the ink ejected from the head 310_1 is emitted; and the moving mechanism 200 that changes the relative position of the head 310_1 and the light emitting unit 380 in relation to the three-dimensional workpiece W. The moving mechanism 200 includes the linear motion mechanism 220, the individual up-and-down mechanism 235_1, and the individual up-and-down mechanism 235_5. The linear motion mechanism 220 changes the relative position of the head 310_1 and the light emitting unit 380 in relation to the workpiece W along the X axis. The individual up-and-down mechanism 235_1 moves the nozzle face FD_1 along the Z axis intersecting with the X axis. The individual up-and-down mechanism 235_5 moves the emission face FU along the Z axis.

Since the head 310_1 and the light emitting unit 380 move up and down by being driven respectively by the separate individual up-and-down mechanisms 235 not identical to each other, the first embodiment makes it possible to perform printing while adjusting the workpiece gap appropriately in accordance with the shape of the workpiece W. Moreover, it is possible to prevent the interference of the workpiece W and the head 310. Furthermore, as compared with a structure in which the head 310_1 and the light emitting unit 380 move up and down by being driven by a single up-and-down mechanism 235, the first embodiment makes it possible to design a structure that makes the X-directional width of the components configured to move individually along the Z axis smaller. Because of the smaller X-directional width, even if the workpiece W has an irregular surface, the head 310 and the light emitting unit 380 are able to enter a recess of the irregular surface, etc. and, therefore, it is possible to eject ink with an appropriate workpiece gap and cure the ink with an appropriate workpiece gap while avoiding interference with the workpiece W and thus improve print quality.

Moving operation for changing, in the X1 direction along the X axis, the relative position of the head 310_1 and the light emitting unit 380 in relation to the workpiece W is defined as the first scan RU1. Given this definition, the head 310_1 ejects ink toward the workpiece W during the execution of the first scan RU1. During the execution of the first scan RU1, a change in the relative position of the nozzle face FD_1 and the emission face FU occurs due to the movement of either one or both of the individual up-and-down mechanism 235_1 and the individual up-and-down mechanism 235_5.

Since the individual up-and-down mechanism 235_1 and the individual up-and-down mechanism 235_5 are configured to perform moving-up/down operation individually, it is possible to perform printing while adjusting the workpiece gap appropriately in accordance with the shape of the workpiece W. Moreover, it is possible to prevent the interference of the workpiece W and the head 310. Furthermore, even if the workpiece W has an irregular surface, the head 310 and the light emitting unit 380 are able to enter a recess, etc. of the irregular surface and, therefore, it is possible to improve print quality.

During the execution of the first scan RU1, the light emitting unit 380 emits pinning light toward the workpiece W.

Applying the pinning light immediately after the ejection of ink from the head 310_1 in the first scan RU1 makes it possible to suppress the spreading of the ink on the face WF.

During the execution of the first scan RU1, the distance d1 between the nozzle face FD_1 and the workpiece W in the Z2 direction along the Z axis is shorter than the distance d5 between the emission face FU and the workpiece W in the Z2 direction.

In the first scan RU1, the nozzle face FD_1 is positioned preferentially closer to the face WF of the workpiece W than the emission face FU is. Because of this structure, the three-dimensional object printing apparatus 100 makes it possible to make the precision of the position where the droplet of ink lands onto the surface of the workpiece W higher, as compared with a structure in which the distance d1 is longer than the distance d5.

Moving operation for changing, in the X2 direction opposite of the X1 direction, the relative position of the head 310_1 and the light emitting unit 380 in relation to the workpiece W is defined as the second scan RU2. Given this definition, the second scan RU2 is executed after the first scan RU1. During the execution of the second scan RU2, the light emitting unit 380 emits full curing light toward the workpiece W. During the execution of the second scan RU2, the distance e5 between the emission face FU and the workpiece W in the Z2 direction along the Z axis is shorter than the distance e1 between the nozzle face FD_1 and the workpiece W in the Z2 direction.

In the second scan RU2, the emission face FU is positioned preferentially closer to the face WF of the workpiece W than the nozzle face FD_1 is. Because of this structure, it is possible to more effectively prevent the ink from remaining uncured, as compared with a structure in which the distance e5 is longer than the distance e1. In general, the following phenomenon could happen. A part of full curing light emitted from the emission face FU and then reflected by the face WF could enter the nozzle N. The presence of ultraviolet light incident upon the nozzle N causes the curing of ink in and around the nozzle N. The curing of the ink causes the clogging of the nozzle N and thus makes it difficult or even impossible to perform ejection normally. The present embodiment makes it possible to make the amount of light incident upon the nozzle N smaller than in a structure in which the distance e5 is longer than the distance e1; therefore, it is possible to suppress the curing of ink in and around the nozzle N of the head 310_1.

During the execution of the second scan RU2, the head 310_1 does not eject ink toward the workpiece W.

Since the head 310_1 does not eject ink toward the workpiece W, there is no need to position the head 310_1 near the workpiece W. Positioning the head 310_1 away from the workpiece W makes it possible to make the amount of light incident upon the nozzle N of the head 310_1 smaller; therefore, it is possible to suppress the curing of ink in and around the nozzle N of the head 310_1.

The intensity of full curing light emitted by the light emitting unit 380 during the execution of the second scan RU2 is higher than the intensity of pinning light emitted during the execution of the first scan RU1.

This makes it possible to prevent ink from remaining uncured on the workpiece W in the second scan RU2, and, moreover, makes it possible to suppress the curing of ink in and around the nozzle N by the pinning light in the first scan RU1.

The three-dimensional object printing apparatus 100 further includes the head 310_2 having the nozzle face FD_2 in which the nozzles N for ejecting ink are provided. The moving mechanism 200 further includes the individual up-and-down mechanism 235_2 that moves the nozzle face FD_2 along the Z axis. During the execution of the first scan RU1, the head 310_2 ejects ink toward the workpiece W. During the execution of the first scan RU1, a change in the relative position of the nozzle face FD_1 and the nozzle face FD_2 occurs due to the movement of either one or both of the individual up-and-down mechanism 235_1 and the individual up-and-down mechanism 235_2. During the execution of the second scan RU2, a change in the relative position of the nozzle face FD_1 and the nozzle face FD_2 does not occur.

Since the head 310_1 and the head 310_2 are caused to move up and down individually in the first scan RU1, it is possible to perform printing while adjusting the workpiece gap appropriately in accordance with the shape of the workpiece W. Moreover, it is possible to prevent the interference of the workpiece W and the head 310. Moreover, since no ink is ejected in the second scan RU2, there is no need to operate the individual up-and-down mechanism 235_1 and the individual up-and-down mechanism 235_2 in the second scan RU2. Since there is no need to operate the individual up-and-down mechanism 235_1 and the individual up-and-down mechanism 235_2 in the second scan RU2, it is possible to make the power consumption of the three-dimensional object printing apparatus 100 lower than in a structure in which the individual up-and-down mechanism 235_1 and the individual up-and-down mechanism 235_2 are operated in the second scan RU2.

During the execution of the second scan RU2, the nozzle face FD_1 and the nozzle face FD_2 are at the substantially equal position Za in the direction along the Z axis.

Setting the nozzle face FD_1 and the nozzle face FD_2 at the substantially equal position Za in the direction along the Z axis and setting the position Za at a level on the Z1-directional side above the most Z1-side level position of the workpiece W makes it possible to prevent the interference of the head 310_1 and the head 310_2 with the workpiece W.

The three-dimensional object printing apparatus 100 further includes the workpiece supporting mechanism 900 that supports the workpiece W and changes either one or both of the position and orientation of the workpiece W.

Since the three-dimensional object printing apparatus 100 includes the workpiece supporting mechanism 900, it is possible to adjust the positional relationship between the three-dimensional workpiece W and the head 310_1 appropriately.

Moving operation that is executed after the second scan RU2 for changing, in the X1 direction, the relative position of the head 310_1 and the light emitting unit 380 in relation to the workpiece W is defined as the third scan RU3. Given this definition, the head 310_1 ejects ink toward the workpiece W during the execution of the third scan RU3. During a period between the second scan RU2 and the third scan RU3, the workpiece supporting mechanism 900 executes the workpiece moving operation WM for changing either one or both of the position and orientation of the workpiece W.

By executing the workpiece moving operation WM, the three-dimensional object printing apparatus 100 is able to move the workpiece W between passes.

The workpiece moving operation WM is executed in a part of the period between the second scan RU2 and the third scan RU3. During the execution of the workpiece moving operation WM, the nozzle face FD_1 and the emission face FU do not overlap with the workpiece W when viewed in the direction along the Z axis.

Because of the retraction of the head 310_1 and the light emitting unit 380 to the position where the nozzle face FD_1 and the emission face FU do not overlap with the workpiece W, it is possible to adjust the position of the workpiece W appropriately without any need for taking the possibility of the interference of the workpiece W with the head 310_1 and the light emitting unit 380 into consideration.

During the execution of the workpiece moving operation WM, driven by either one or both of the individual up-and-down mechanism 235_1 and the individual up-and-down mechanism 235_2, the movement of either one or both of the nozzle face FD_1 and the emission face FU along the Z axis occurs.

The position of the head 310_1 in the direction along the Z axis and the position of the light emitting unit 380 in the direction along the Z axis are adjusted during the execution of the workpiece moving operation WM in accordance with the start position PS3 of the third scan RU3. This makes it possible to shorten non-print time between passes. Therefore, it is possible to shorten the time taken for the manufacturing of a product including the workpiece W and thus improve productivity.

2. Modification Examples

The embodiment described as examples above can be modified in various ways. Some specific examples of modification are described below. Two or more modification examples selected arbitrarily from the description below may be combined as long as they are not contradictory to each other or one another.

2.1. First Modification Example

In the first embodiment, the three-dimensional object printing apparatus 100 may include a light-shielding plate 390 provided between the heads 310 and the light emitting unit 380 and configured to block ultraviolet light.

Figure 11:
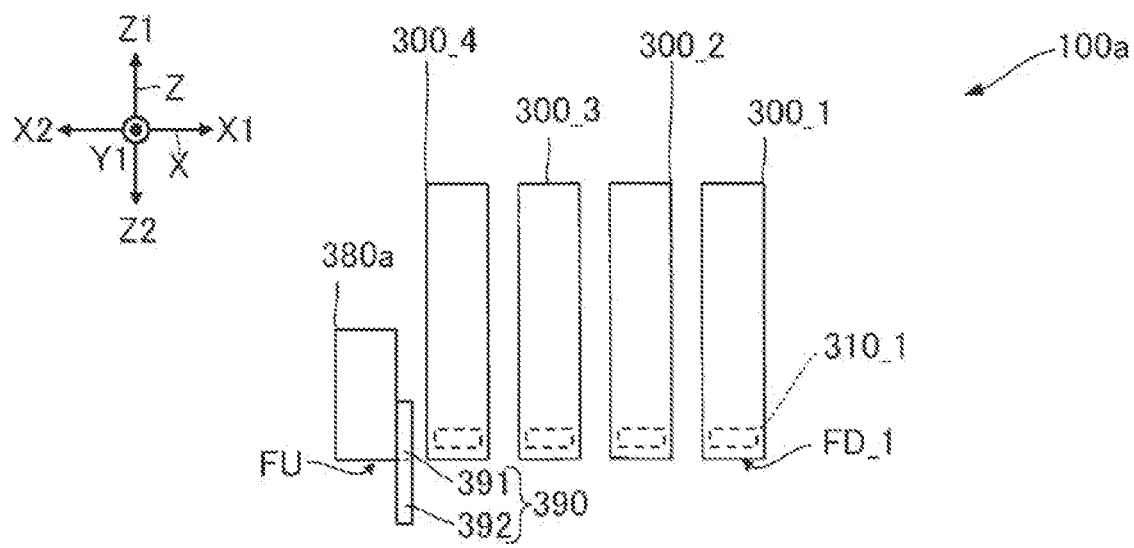
FIG. 11 is a diagram for explaining a three-dimensional object printing apparatus according to a first modification example.

FIG. 11 is a diagram for explaining a three-dimensional object printing apparatus 100a according to a first modification example. The three-dimensional object printing apparatus 100a is different from the three-dimensional object printing apparatus 100 in that it includes a light emitting unit 380a in place of the light emitting unit 380. The light emitting unit 380a is different from the light emitting unit 380 in that the light-shielding plate 390 is bonded to its X1-side lateral surface. The light-shielding plate 390 is a low-profile member extending along the Y-Z plane. The light-shielding plate 390 includes a first portion 391 and a second portion 392. The first portion 391 is the Z1-side portion of the light-shielding plate 390. The X2-side surface of the first portion 391 is bonded to the light emitting unit 380a. The second portion 392 blocks ultraviolet light emitted from the light emitting unit 380.

The first modification example makes it possible to make the amount of light incident upon the nozzle N smaller by blocking the ultraviolet light by the second portion 392. Therefore, it is possible to suppress the curing of ink in and around the nozzle N of the head 310_1.

Though the light-shielding plate 390 is bonded to the X1-side lateral surface of the light emitting unit 380a in the first modification example, the scope of the present disclosure is not limited to this example. For example, the light-shielding plate 390 may be bonded to the X2-side lateral surface of the liquid ejecting unit 300_4.

2.2. Second Modification Example

In each example of the exemplary embodiment described above, the three-dimensional object printing apparatus 100 includes the individual up-and-down mechanisms 235_1 to 235_4, which cause the respective liquid ejecting units 300_1 to 300_4 to move up and down individually, and the individual up-and-down mechanism 235_5, which causes the light emitting unit 380 to move up and down. However, the individual up-and-down mechanism 235 that causes the light emitting unit 380 to move up and down may be identical to the individual up-and-down mechanism 235 that causes the liquid ejecting unit 300_4, namely, the one closest to the light emitting unit 380, to move up and down.

Figure 12:
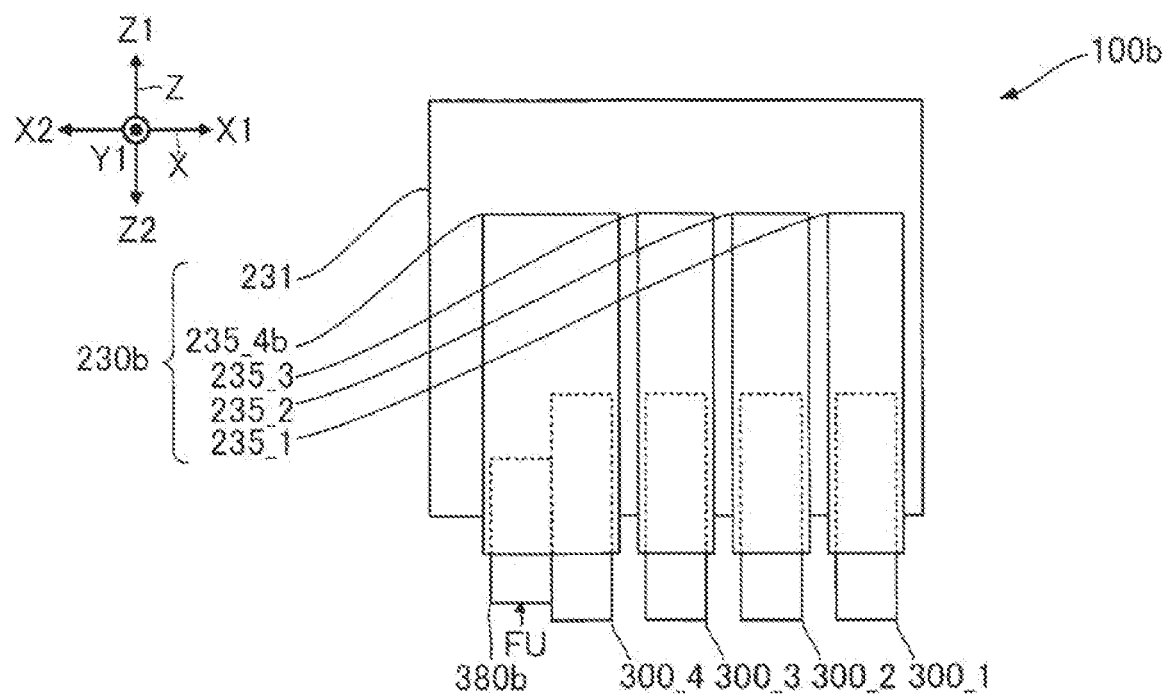
FIG. 12 is a diagram for explaining a three-dimensional object printing apparatus according to a second modification example.

FIG. 12 is a diagram for explaining a three-dimensional object printing apparatus 100b according to a second modification example. The three-dimensional object printing apparatus 100b is different from the three-dimensional object printing apparatus 100 in that it includes an up-and-down mechanism 230b in place of the up-and-down mechanism 230 and includes a light emitting unit 380b in place of the light emitting unit 380. The up-and-down mechanism 230b is different from the up-and-down mechanism 230 in that it does not include the individual up-and-down mechanism 235_5 and includes an individual up-and-down mechanism 235_4b in place of the individual up-and-down mechanism 235_4.

The light emitting unit 380b is bonded to the X2-side lateral surface of the liquid ejecting unit 300_4. The individual up-and-down mechanism 235_4b causes the light emitting unit 380b also to move up and down by causing the liquid ejecting unit 300_4 to move up and down.

In the second modification example, one of any two of the individual up-and-down mechanisms 235_1 to 235_3 is an example of "first up-and-down mechanism". The other of the two is an example of "third up-and-down mechanism". The individual up-and-down mechanism 235_4b is an example of "second up-and-down mechanism".

2.3. Third Modification Example

In each example of the exemplary embodiment described above, the three-dimensional object printing apparatus 100 includes one light emitting unit 380 for the four heads 310. However, the three-dimensional object printing apparatus 100 may include one light emitting unit 380 for each one head 310.

Figure 13:
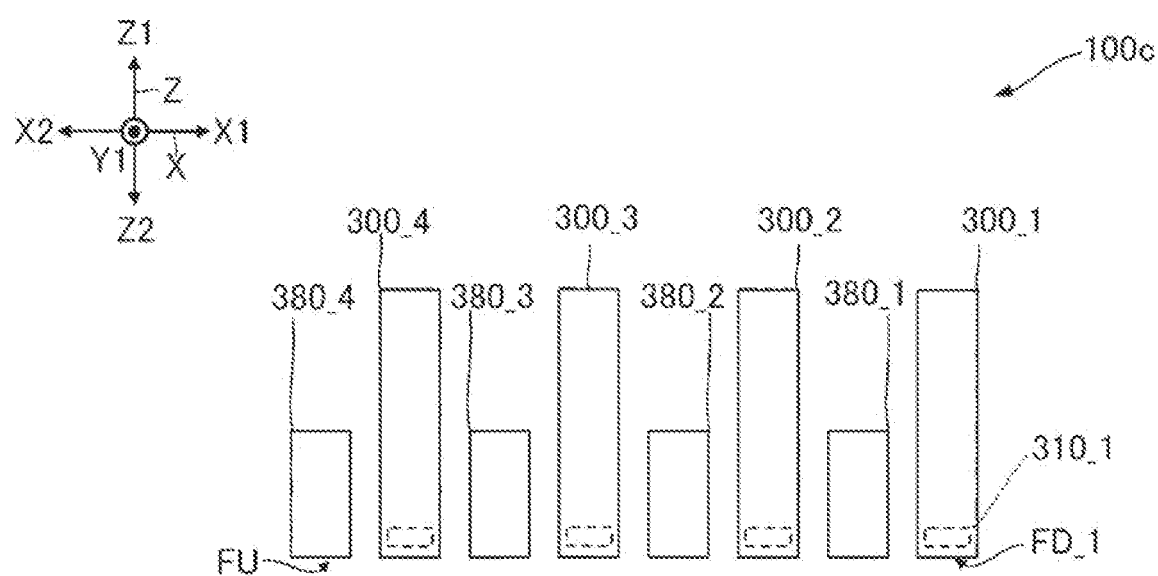
FIG. 13 is a diagram for explaining a three-dimensional object printing apparatus according to a third modification example.

FIG. 13 is a diagram for explaining a three-dimensional object printing apparatus 100c according to a third modification example. The three-dimensional object printing apparatus 100c is different from the three-dimensional object printing apparatus 100 in that it includes four light emitting units 380_1 to 380_4. For each of m=1 to 3, the light emitting unit 380_m is provided between the liquid ejecting unit 300_m and the liquid ejecting unit 300_m+1, and emits pinning light to ink ejected by the head 310_m. The light emitting unit 380_4 is provided on the X2-directional side next to the liquid ejecting unit 300_4, emits pinning light to ink ejected by the head 310_4, and emits full curing light to ink ejected by each of the heads 310_1 to 310_4. Since the light emitting unit 380_4 emits full curing light whereas the light emitting units 380_1 to 380_3 emit pinning light as described here, the light emitting unit 380_4 is able to emit ultraviolet light having higher intensity than that of the light emitting units 380_1 to 380_3.

The light emitting units 380_1 to 380_4 move up and down similarly as the liquid ejecting units 300_1 to 300_4 do. For example, for each of k=1 to 4, the individual up-and-down mechanism 235_k causes the light emitting unit 380_k and the liquid ejecting unit 300_k to move up and down. Alternatively, for each of k=1 to 4, the three-dimensional object printing apparatus 100b may include, separately from the individual up-and-down mechanism 235_k that causes the liquid ejecting unit 300_k to move up and down, the individual up-and-down mechanism 235 that causes the light emitting unit 380_k to move up and down.

2.4. Fourth Modification Example

In each example of the exemplary embodiment described above, the three-dimensional object printing apparatus 100 includes the separate individual up-and-down mechanisms 235 that cause the respective liquid ejecting units 300 to move up and down; however, a plurality of liquid ejecting units 300 may move up and down by being driven by one individual up-and-down mechanism 235. For example, the three-dimensional object printing apparatus 100 according to a fourth modification example includes two individual up-and-down mechanisms 235, the liquid ejecting units 300_1 to 300_4, and the light emitting unit 380. One of the two individual up-and-down mechanisms 235 causes the liquid ejecting units 300_1 and 300_2 to move up and down. The other of the two individual up-and-down mechanisms 235 causes the liquid ejecting units 300_3 and 300_4 to move up and down.

2.5. Fifth Modification Example

In each example of the exemplary embodiment described above, during the execution of the first scan RU1, the second scan RU2, the third scan RU3, and the fourth scan RU4, the relative position of the head 310 and the light emitting unit 380 in relation to the workpiece W in the direction along the X axis is changed by the movement of the linear motion mechanism 220. However, the scope of the present disclosure is not limited to this example. Specifically, the relative position of the head 310 and the light emitting unit 380 in relation to the workpiece W may be changed by causing the workpiece W to move in the direction along the X axis by the movement of the workpiece supporting mechanism 900. That is, the means for changing the relative position of the head 310 and the light emitting unit 380 in relation to the workpiece W in the direction along the X axis is not limited.

2.6. Sixth Modification Example

In the first scan RU1 of each example of the exemplary embodiment described above, the distance dl between the nozzle face FD and the face WF in the Z2 direction may be longer than the distance d5 between the emission face FU and the face WF in the Z2 direction.

2.7. Seventh Modification Example

In the second scan RU2 of each example of the exemplary embodiment described above, the distance e5 between the emission face FU and the face WF in the Z2 direction may be longer than the distance el between the nozzle face FD_1 and the face WF in the Z2 direction.

2.8. Eighth Modification Example

Though it has been described in each example of the exemplary embodiment above that the three-dimensional object printing apparatus 100 executes the second scan RU2 after the first scan RU1, the second scan RU2 does not necessarily have to be executed. That is, the pinning process may be omitted. For example, the light emitting unit 380 may emit full curing light in the first scan RU1.

2.9. Ninth Modification Example

During the execution of the workpiece moving operation WM of each example of the exemplary embodiment described above, the individual up-and-down mechanism 235_1 and the individual up-and-down mechanism 235_2 do not necessarily have to be operated.

2.10. Tenth Modification Example

In each example of the exemplary embodiment described above, when the three-dimensional object printing apparatus 100 executes the workpiece moving operation WM, the nozzle face FD_1 and the emission face FU may overlap with the workpiece W when viewed in the direction along the Z axis. Specifically, the three-dimensional object printing apparatus 100 may execute the workpiece moving operation WM after moving the heads 310_1 to 310_4 and the light emitting unit 380 in the Z1 direction so as not to interfere with the workpiece W, after the completion of the second scan RU2. That is, in the tenth modification example, during the execution of the workpiece moving operation WM, the nozzle face FD_1 and the emission face FU overlap with the workpiece W when viewed in the direction along the Z axis.

As a specific example of the tenth modification example, the up-and-down mechanism 230 may include an all up-and-down mechanism for moving all of the individual up-and-down mechanisms 235_1 to 235_5 together. The three-dimensional object printing apparatus 100 may move the heads 310_1 to 310_4 and the light emitting unit 380 in the Z1 direction so as not to interfere with the workpiece W by moving all of the individual up-and-down mechanisms 235_1 to 235_5 together in the Z1 direction by the all up-and-down mechanism, after the completion of the second scan RU2.

What is claimed is:
1. A three-dimensional object printing apparatus, comprising:
   a first head having a first nozzle face in which a first nozzle for ejecting liquid is provided;
   an energy emitter having an emission face from which energy for curing the liquid ejected from the first head is emitted; and
   a moving mechanism that changes relative positions of the first head and the energy emitter in relation to a workpiece, wherein
   the moving mechanism includes:
      a first linear motion mechanism that has a carriage carrying the first head and the energy emitter and a first motor generating a driving force to move the carriage and that changes the relative positions of the first head and the energy emitter in relation to the workpiece along a first axis;
a first up-and-down mechanism that has a second motor generating a driving force to move the first head up and down partly within the first up-and-down mechanism to change a position of the first nozzle face along a second axis intersecting with the first axis; and
a second up-and-down mechanism that has a third motor generating a driving force to move the energy emitter up and down partly within the second up-and-down mechanism to change a position of the emission face along a third axis parallel to the second axis, wherein
the first linear motion mechanism changes the relative positions of the first head and the energy emitter in relation to the workpiece in a first direction along the first axis during execution of a first scan by using the first motor,
the first head ejects the liquid toward the workpiece during the execution of the first scan, and
the first up-and-down mechanism and the second up-and-down mechanism change the positions of the first nozzle face and the emission face, respectively, such that a distance between the first nozzle face and the workpiece in a second direction along the second axis is shorter than a distance between the emission face and the workpiece in the second direction during the execution of the first scan by using the second motor and the third motor, respectively.

2. The three-dimensional object printing apparatus according to claim 1, wherein
the first linear motion mechanism changes the relative positions of the first head and the energy emitter in relation to the workpiece in a third direction opposite to the first direction during execution of a second scan,
the second scan is executed after the first scan,
the energy emitter emits the energy toward the workpiece during the execution of the second scan, and
the first up-and-down mechanism and the second up-and-down mechanism change the positions of the first nozzle face and the emission face, respectively, such that the distance between the emission face and the workpiece in the second direction along the third axis is shorter than the distance between the first nozzle face and the workpiece in the second direction during the execution of the second scan.

3. The three-dimensional object printing apparatus according to claim 2, wherein
the first head does not eject the liquid toward the workpiece during the execution of the second scan.

4. The three-dimensional object printing apparatus according to claim 2, wherein
intensity of the energy emitted by the energy emitter during the execution of the second scan is higher than intensity of the energy emitted during the execution of the first scan.

5. The three-dimensional object printing apparatus according to claim 2, further comprising:
a second head having a second nozzle face in which a second nozzle for ejecting liquid is provided, wherein
the moving mechanism further includes a third up-and-down mechanism that has a fourth motor generating a driving force to move the second head and that changes a position of the second nozzle face along a fourth axis parallel to the second axis,
the second head ejects the liquid toward the workpiece during the execution of the first scan,
the third up-and-down mechanism changes the position of the second nozzle face during the execution of the first scan, and
the third up-and-down mechanism does not change the position of the second nozzle face during the execution of the second scan.

6. The three-dimensional object printing apparatus according to claim 5, wherein
during the execution of the second scan, the first nozzle face and the second nozzle face are capable of being positioned at a substantially equal position in the second direction along the second and fourth axis, respectively,
and that changes either one or both of a position and orientation of the workpiece.

7. The three-dimensional object printing apparatus according to claim 2, wherein
the first linear motion mechanism changes the relative positions of the first head and the energy emitter in relation to the workpiece in the first direction during execution of a third scan that is executed after the second scan,
the first head ejects the liquid toward the workpiece during the execution of the third scan, and
during a period between the second scan and the third scan, a workpiece supporting mechanism that supports the workpiece executes a workpiece moving operation for changing either one or both of the position and the orientation of the workpiece.

8. The three-dimensional object printing apparatus according to claim 7, wherein
the workpiece moving operation is executed in a part of the period between the second scan and the third scan, and
during execution of the workpiece moving operation, the first nozzle face and the emission face do not overlap with the workpiece when viewed in the second direction.

9. The three-dimensional object printing apparatus according to claim 7, wherein
the first up-and-down mechanism and the second up-and-down mechanism change the positions of the first nozzle face and the emission face during the execution of the workpiece moving operation.

10. The three-dimensional object printing apparatus according to claim 2, wherein
the second up-and-down mechanism changes the position of the emission face such that the distance between the emission face and the workpiece in the second direction during the execution of the second scan is shorter than the distance between the emission face and the workpiece in the second direction during the execution of the first scan.

11. The three-dimensional object printing apparatus according to claim 2, wherein
the first up-and-down mechanism changes the position of the first nozzle face such that the distance between the first nozzle face and the workpiece in the second direction during the execution of the first scan is shorter than the distance between the first nozzle face and the workpiece in the second direction during the execution of the second scan.

12. The three-dimensional object printing apparatus according to claim 1, further comprising:

a workpiece supporting mechanism that supports the workpiece and that changes either one or both of a position and orientation of the workpiece.

13. The three-dimensional object printing apparatus according to claim 1, further comprising:
a light-shielding portion that is provided between the first head and the energy emitter along the first axis and that blocks light emitted from the energy emitter and directed toward the first nozzle face.

14. The three-dimensional object printing apparatus according to claim 13, wherein
the light-shielding portion is bonded to the energy emitter.

15. The three-dimensional object printing apparatus according to claim 13, wherein
the light-shielding portion is bonded to the first head.

16. The three-dimensional object printing apparatus according to claim 1, wherein
the first head has a pressure adjustment valve that adjusts pressure of the liquid and is located above the first nozzle face.

* * * * *